United States Patent [19]
Lee et al.

[11] Patent Number: 5,699,238
[45] Date of Patent: Dec. 16, 1997

[54] ZERO VOLTAGE SWITCHING CONTROLLER OF RESONANCE MODE CONVERTER AND ELECTRONIC BALLAST USING THE SAME

[75] Inventors: Young-sik Lee, Anyang; Hyun-min Jo, Seoul; Kyung-ha Jee; Nak-choon Choi, both of Bucheon, all of Rep. of Korea

[73] Assignee: Samsung Electronics Co., Ltd., Suwon, Rep. of Korea

[21] Appl. No.: 647,105

[22] Filed: May 9, 1996

Related U.S. Application Data

[62] Division of Ser. No. 291,594, Aug. 16, 1994, Pat. No. 5,546,300.

[30] Foreign Application Priority Data

Aug. 17, 1993 [KR] Rep. of Korea ............... 93-15908

[51] Int. Cl.$^6$ ............................................. H02M 3/335
[52] U.S. Cl. ................................... 363/21; 323/235
[58] Field of Search ........................... 363/16, 17, 20, 363/21, 97, 98, 131, 132; 323/235, 319; 315/123, 125, 126, 207, 209 R

[56] References Cited

U.S. PATENT DOCUMENTS

| | | | |
|---|---|---|---|
| 4,860,184 | 8/1989 | Tabisz et al. | 363/17 |
| 4,933,605 | 6/1990 | Quazi et al. | 315/224 |
| 5,063,332 | 11/1991 | El-Hamamsy | 315/248 |
| 5,118,997 | 6/1992 | El-Hamamsy | 315/248 |
| 5,325,283 | 6/1994 | Farrington et al. | 363/21 |
| 5,416,387 | 5/1995 | Cuk | 315/209 R |
| 5,426,350 | 6/1995 | Lai | 315/244 |
| 5,539,630 | 7/1996 | Pietkiewicz et al. | 363/17 |

*Primary Examiner*—Matthew V. Nguyen
*Attorney, Agent, or Firm*—Cushman Darby & Cushman, IP Group of Pillsbury Madison & Sutro LLP

[57] ABSTRACT

A controller for performing a zero voltage switching using a resonance mode converter, and an electronic ballast adopting the same, includes a power controller, a shutdown protection circuit and a brownout circuit, and performs a switching when voltage of a switching element is zero, thereby preventing excessive power consumption, enhancing efficiency and decreasing noise.

5 Claims, 16 Drawing Sheets

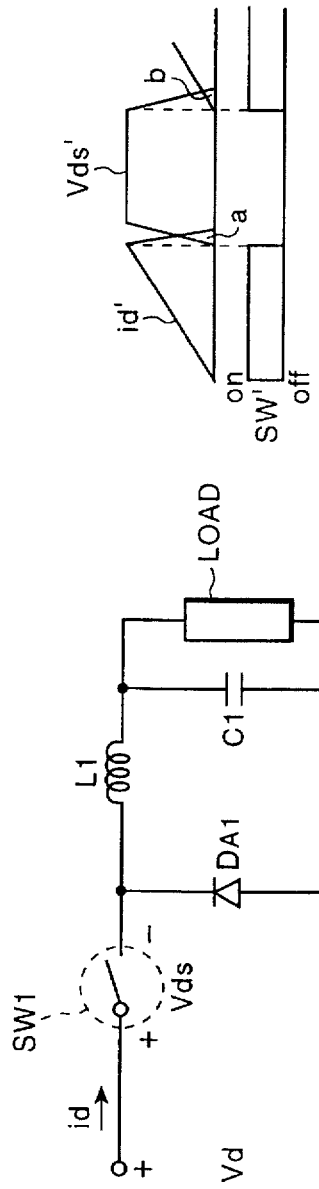
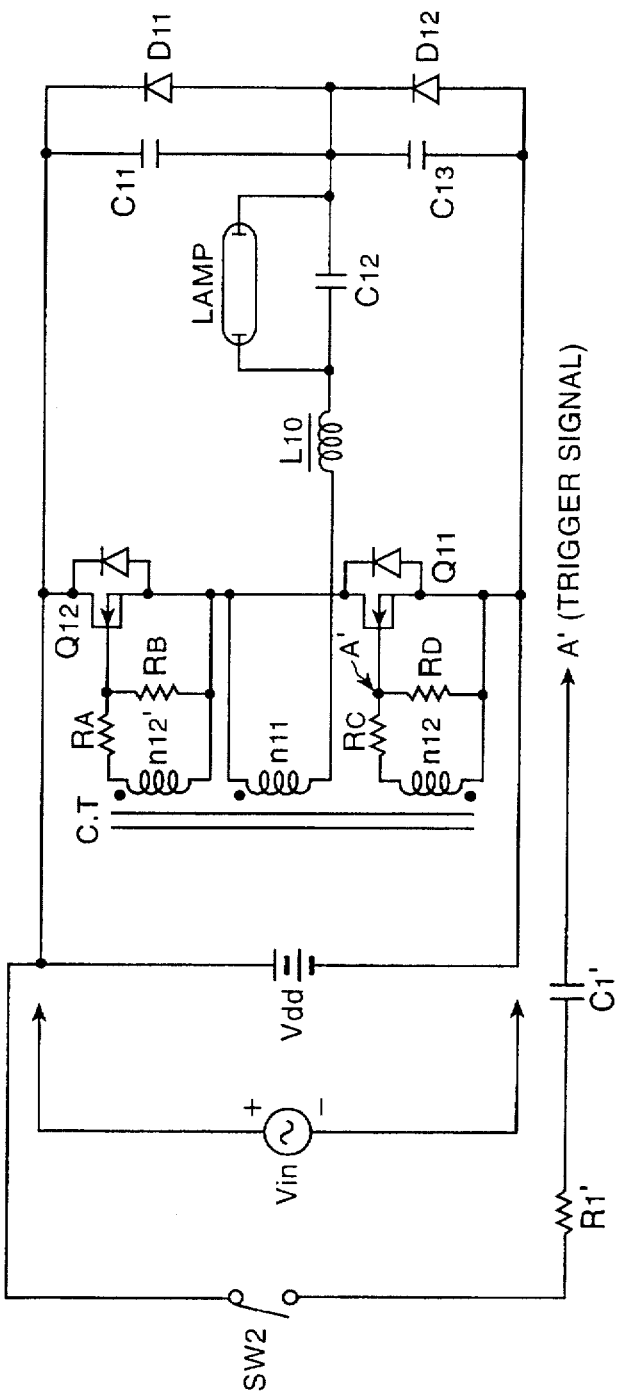
Fig. 1A (PRIOR ART)
Fig. 1B (PRIOR ART)
Fig. 1C (PRIOR ART)
Fig. 2 (PRIOR ART)

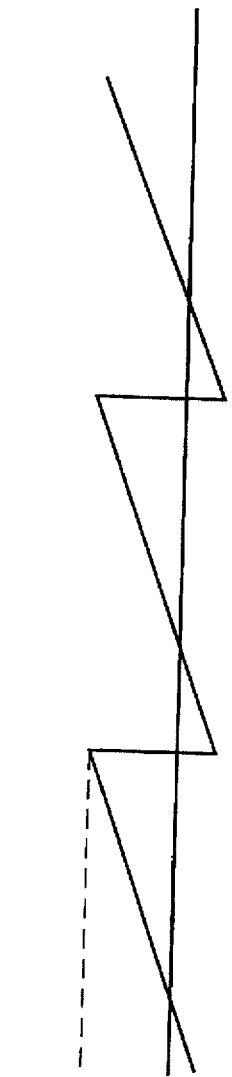
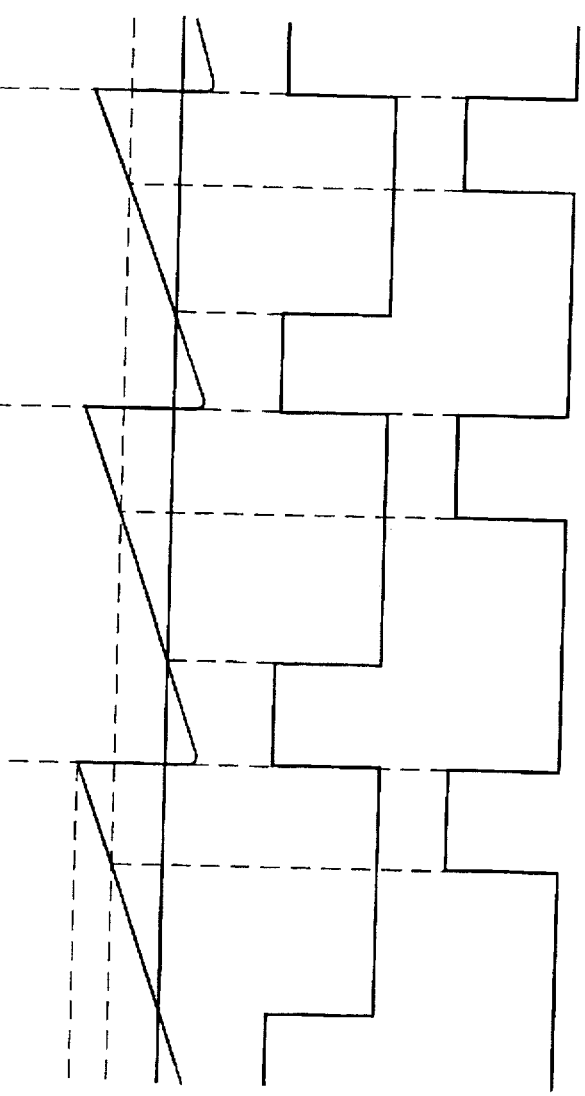
Fig. 6A  BC₁₀ VOLTAGE
Fig. 6B  U3 OUTPUT
Fig. 6C  BC₁₀ VOLTAGE / Vref3 / Vref2
Fig. 6D  U4B OUTPUT
Fig. 6E  U4A OUTPUT

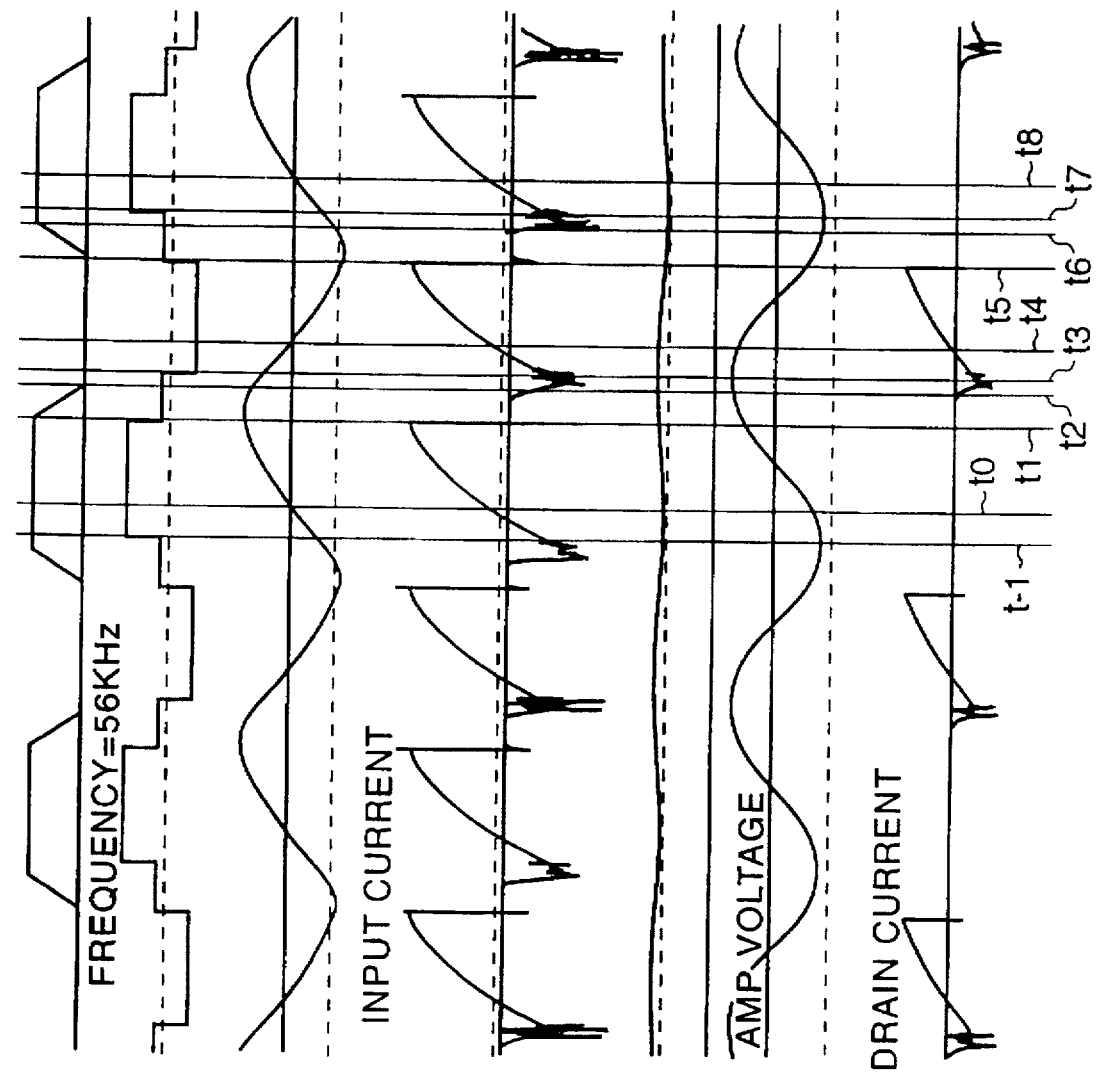

*Fig. 12*
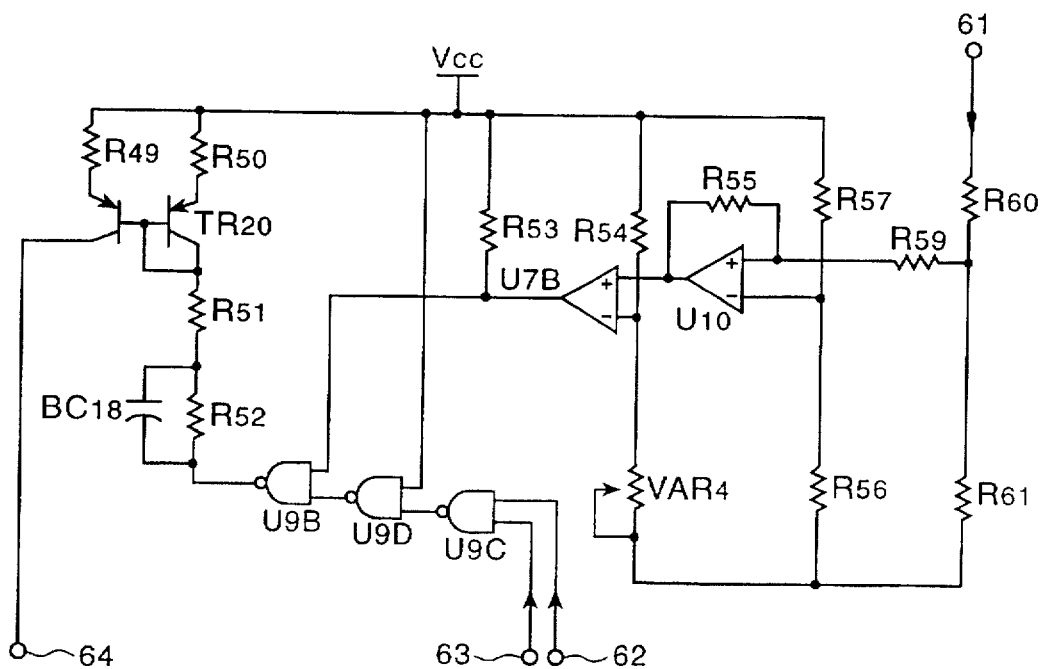
*Fig. 13A*
*Fig. 13B*
*Fig. 13C*
*Fig. 13D*
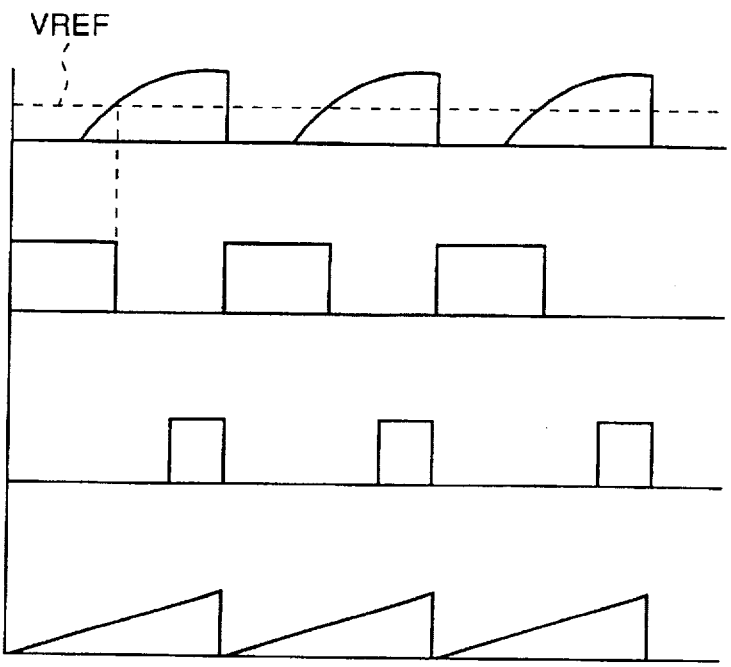

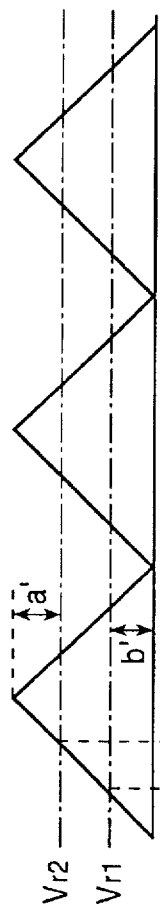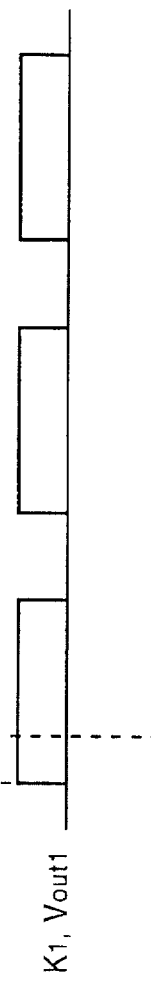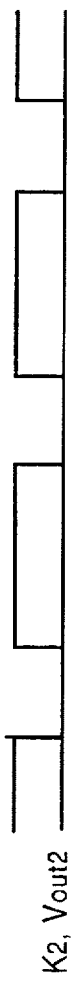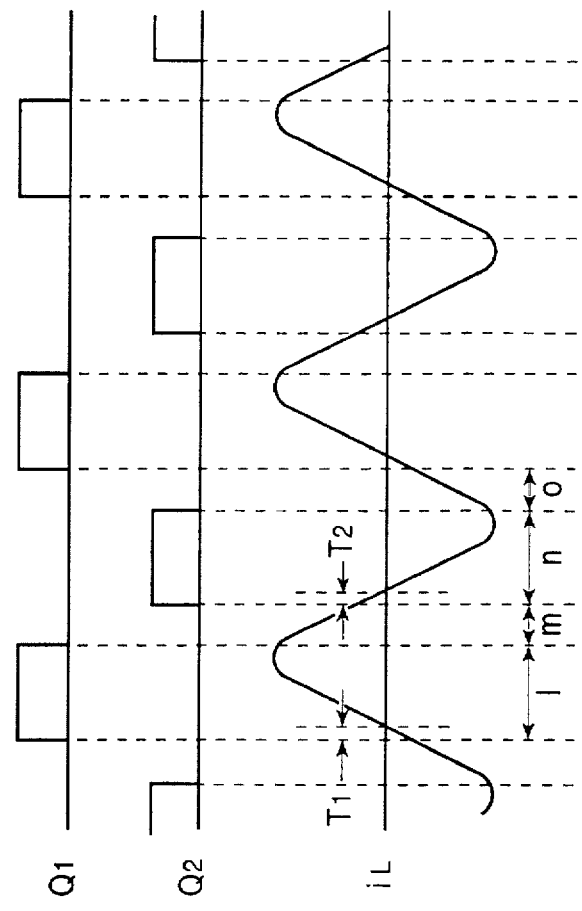
Fig. 19A
Fig. 19B
Fig. 19C
Fig. 19D
Fig. 19E
Fig. 19F

ZERO VOLTAGE SWITCHING CONTROLLER OF RESONANCE MODE CONVERTER AND ELECTRONIC BALLAST USING THE SAME This application is a Division of U.S. patent application Ser. No. 08/291,594 filed Aug. 16, 1994, now U.S. Pat. No. 5,546,300.

BACKGROUND OF THE INVENTION

The present invention relates to a resonance mode converter power supply, and more particularly, to a controller adopting a zero voltage switching system and an electronic ballast using the same.

In general, there are two kinds of power supplies. One is a series power supply for continuously feeding power and the other is a switching mode power supply (SMPS) having enhanced efficiency and reduced volume by employing a switching element. Recently, the demand for the SMPS-type power supply has increased greatly and the switching frequency thereof has gradually increased as well, in accordance with the to continuing trend towards the manufacture of lightweight, thin, simple and small electronic appliances. As one kind of SMPS, the newly introduced resonance mode power supply (RMPS), more specifically, a resonance mode converter, is known for its high efficiency, reduced volume and good EMI characteristics. In the converter employing such a switching system, the switching frequency is increased electric power to decrease the number of components, increase efficiency or decrease the ripple of the output. This, however, unfortunately results in an increase of switching electric power loss. That is, in a power supply of the conventional apparatus, the switching element is constituted by a power semiconductor device and is generally a bipolar transistor or field effect transistor (FET). Accordingly, high switching frequencies tend to decrease power efficiency and cause greater stress on the switching element.

FIG. 1A is a schematic view showing the conventional converter which has an input power Vd supplied to an input, a switch SW1 connected in series with the positive input terminal, a diode $D_{A1}$ reverse-bias connected between the output side of switch SW1 and the negative input terminal, a capacitor C1 connected in parallel to a load, and an inductor L1 connected in line between the capacitor-load combination and the cathode of diode $D_{A1}$. Thus, power is provided to the load according to the operation (opening and closing) of switch SW1. Here, Vds is the voltage developed across switch SW1, and id is the current through switch SW1.

FIG. 1B is a waveform chart showing voltage Vds and current id which are developed across and flow through switch SW1, respectively, as the device of FIG. 1A operates. In addition, as shown in FIGS. 1B and 1C, SW' of FIG. 1C represents the timing when switch SW1 is turned on (high) and off (low), id is the waveform of current id flowing through switch SW1 of FIG. 1A, Vds' is the waveform of voltage Vds developed across switch SW1, "a" is the power loss when switch SW1 if turned off, and "b" is power loss when switch SW1 is turned on.

As shown by FIGS. 1A, 1B and 1C, when switch SW1 is turned on, the current id starts to flow through the switch, and then, even when switch SW1 is turned off, current id does not immediately fall to zero and a current value relevant to the amount of region "a" continues flowing. Likewise, voltage Vds is developed across switch SW1 and is maintained at a steady state with switch SW1 open. Voltage Vds does not immediately fall to zero even when switch SW1 is turned on, and a voltage relevant to the amount of region "b" remains. Accordingly, when switch SW1 is turned off, electric power relevant to the amount of region "a" is wasted, and when switch SW1 is turned on, electric power relevant to the amount of region "b" is consumed as heat in switch SW1. As for such electric power loss caused by the on/off operation of switch SW1, the ratio of the electric power loss to the whole period increases when the switching frequency is increased so as to increase the ripple of the output voltage or to reduce the inductance and capacitance used in the converter. Thus, the overall system efficiency is lowered. That is, the conventional control apparatus increases switching stress and power loss when the switching frequency is increased.

FIG. 2 is a schematic view showing the conventional electronic ballast which includes first and second switching elements $Q_{11}$ and $Q_{12}$ across which a direct-current (DC) voltage Vdd is applied by rectifying an alternating-current (AC) input Vin, a transformer C.T having a primary winding n11 serially connected to an inductor $L_{10}$ and a capacitor $C_{12}$ and two secondary windings n12 and n12' one terminal of each being connected to the gates of first and second switching elements Q11 and Q12 via resistors $R_A$, $R_B$, $R_C$ and $R_D$, respectively, a lamp connected in parallel to capacitor $C_{12}$, capacitors $C_{11}$ and $C_{13}$ connected between one terminal of capacitor $C_{12}$ and first and second switching elements $Q_{11}$ and $Q_{12}$, and diodes $D_{11}$ and $D_{12}$. Thus, when switch SW2 is turned on, the gate of first switching element $Q_{11}$ is triggered via a resistor $R_1'$ and a capacitor $C_1'$.

At the moment when switch SW2 is turned on, and thus first switching element $Q_{11}$ is also turned on, a lamp driving current flows through capacitors $C_{11}$ and $C_{12}$, inductor $L_{10}$ and primary winding n11. When capacitor $C_{11}$ completes charging, a reverse electric power is generated across secondary winding n12'. Thus, a driving current flows through primary winding n11, inductor $L_{10}$ and capacitors $C_{12}$ and $C_{13}$ as second switching element $Q_{12}$ is turned on. Here, when capacitor $C_{13}$ completes charging, a reverse electric power is generated across secondary winding n12. Thus, first switching element $Q_{11}$ is turned on again. When a switching frequency which repeatedly turns on and off first and second switching elements $Q_{11}$ and $Q_{12}$ matches the resonant frequency of a series resonant circuit created by inductor $L_{10}$ and capacitor $C_{12}$, a high voltage is generated across capacitor $C_{12}$, which lights the lamp.

The conventional device not only has no function for enhancing the lamp's durability, it in fact accelerates the aging process of the lamp. Moreover, most of the conventional devices employ a hard switching system, which causes an increase of switching loss and switching element damage due to overheating. Thus, system stability cannot be assured and noise is generated.

SUMMARY OF THE INVENTION

Accordingly, it is an object of the present invention to provide a resonance mode power supply which enables a sufficient electric power supply by employing a zero voltage switching (ZVS) system.

It is another object of the present invention to provide an electronic ballast which maintains overall system stability by sensing the changing state of the input voltage and load, prevents the switching element from being damaged by excessive current and overheating, and detects ambient illuminance for controlling optical output in order to save energy.

It is still another object of the present invention to provide an electronic ballast control circuit which employs a ZVS system.

It is yet another object of the present invention to provide a resonance mode converter which employs a ZVS system.

To accomplish the above objects of the present invention, there is provided a resonance mode power supply which switches a DC voltage, i.e., rectification of a commercial AC voltage, so as to supply electric power to a load via a resonator. The resonance mode power supply according to the present invention:

includes a resonance mode converter for supplying electrical power to the load by performing zero voltage switching on the DC voltage using a predetermined frequency according to a drive signal. The present invention also includes, a zero voltage switching (ZVS) control device for controlling the resonance mode converter by receiving outputs of the DC voltage and the resonance mode converter and outputting the drive signal depending on the states of the commercial AC voltage and the load so as to perform zero voltage switching.

Thus, an efficient power supply is achieved by reducing the power loss caused by the switching, to thereby protect the system and the load under abnormal conditions.

To accomplish another object of the present invention, there is provided an electronic ballast for providing electric power to a lamp by means of switching a DC voltage, i.e., rectification of a commercial AC voltage. The electronic ballast includes a resonance mode converter for receiving the DC voltage and performing zero voltage switching, using a predetermined frequency, on the input voltage according to a drive signal and supplying electric power to the load according to a control signal. The electronic ballast according to the present invention also includes, a zero voltage switching controller for receiving outputs of the DC voltage and the resonance mode converter so as to output the drive signal and the control signal depending on the states of the commercial AC voltage and the load.

Thus, power can be efficiently supplied to the load by reducing power loss caused by the switching, and the system can be protected under abnormal conditions.

To accomplish still another object of the present invention, there is provided an electronic ballast integration circuit device that includes a resonance mode converter for supplying electric power to the load according to a control signal by having first and second switching elements for receiving a DC voltage, i.e., rectification of a commercial AC voltage, and performing a zero voltage switching on the input voltage, using a predetermined frequency, according to a drive signal. The electronic ballast integration circuit device includes:

a drive signal generator for generating a sawtooth wave signal so as to compare with a reference voltage and outputting the drive signal and a zero voltage switching enable signal;

a power controller for receiving the current introduced from the resonance mode converter and the current that flows through the DC voltage and the load, and for outputting a control current to the drive signal generator so as to maintain constant electric power applied to the load, and for controlling an oscillation frequency;

a zero voltage switching ensuring circuit for receiving the current introduced from the resonance mode converter and the zero voltage switching enable signal, and for increasing the dead time of the drive signal so that the resonance mode converter can perform zero voltage switching;

a shutdown protect circuit for receiving the current introduced from the resonance mode converter and the current that flows through the DC voltage and the load, and for shutting down the drive signal, during an abnormal state; and a brownout circuit for receiving the DC voltage, and for shutting down a control current of the power controller and outputting a predetermined control current when sensing the voltage in use is lowered to below a predetermined voltage, and lowering the electric power applied to the load according to an input voltage so as to save energy.

To accomplish yet another object of the present invention, there is provided a resonance mode power supply for receiving a DC voltage, i.e., rectification of a commercial AC voltage, and for performing a zero voltage switching on the input voltage using a predetermined frequency according to a drive signal so as to supply an electric power to a load. The resonance mode power supply includes:

a feedback control portion for introducing a feedback signal from the resonance mode converter so as to compare with a reference voltage, and for amplifying the difference so as to convert into a control current;

a main control portion for controlling a frequency generated from a triangular wave according to the current introduced from the feedback control portion, and for comparing the frequency with a reference voltage so as to output a drive signal; and a no-load sensor for introducing a feedback signal from the resonant type converter so as to compare with the reference voltage having a hysteresis characteristic, and for sensing a no-load state so that a drive signal can be shut down in the case of a no-load state.

Thus, power loss caused by the switching can be reduced, while obtaining an efficient power supply, and the system can be protected from no-load conditions.

BRIEF DESCRIPTION OF THE DRAWINGS

The above objects and other advantages of the present invention will become more apparent by describing in detail a preferred embodiment thereof with reference to the attached drawings in which:

FIGS. 1A, 1B and 1C are schematic views illustrating the switching operation of a conventional converter;

FIG. 2 is a schematic circuit showing a conventional electronic ballast circuit;

FIGS. 6A to 6E illustrate operational waveforms of the sawtooth wave signal generator of FIG. 5;

FIGS. 9A to 9F illustrate operation waveforms of an apparatus of the present invention;

FIG. 12 is a schematic circuit showing the zero voltage switching ensuring circuit of FIG. 3;

FIGS. 13A to 13D illustrate operational waveforms of the circuit shown in FIG. 12;

FIGS. 19A to 19F illustrate operational waveforms of the device shown in FIG. 18.

DETAILED DESCRIPTION OF THE INVENTION

The present invention will be explained in more detail with reference to the attached drawings.

Figure 3:
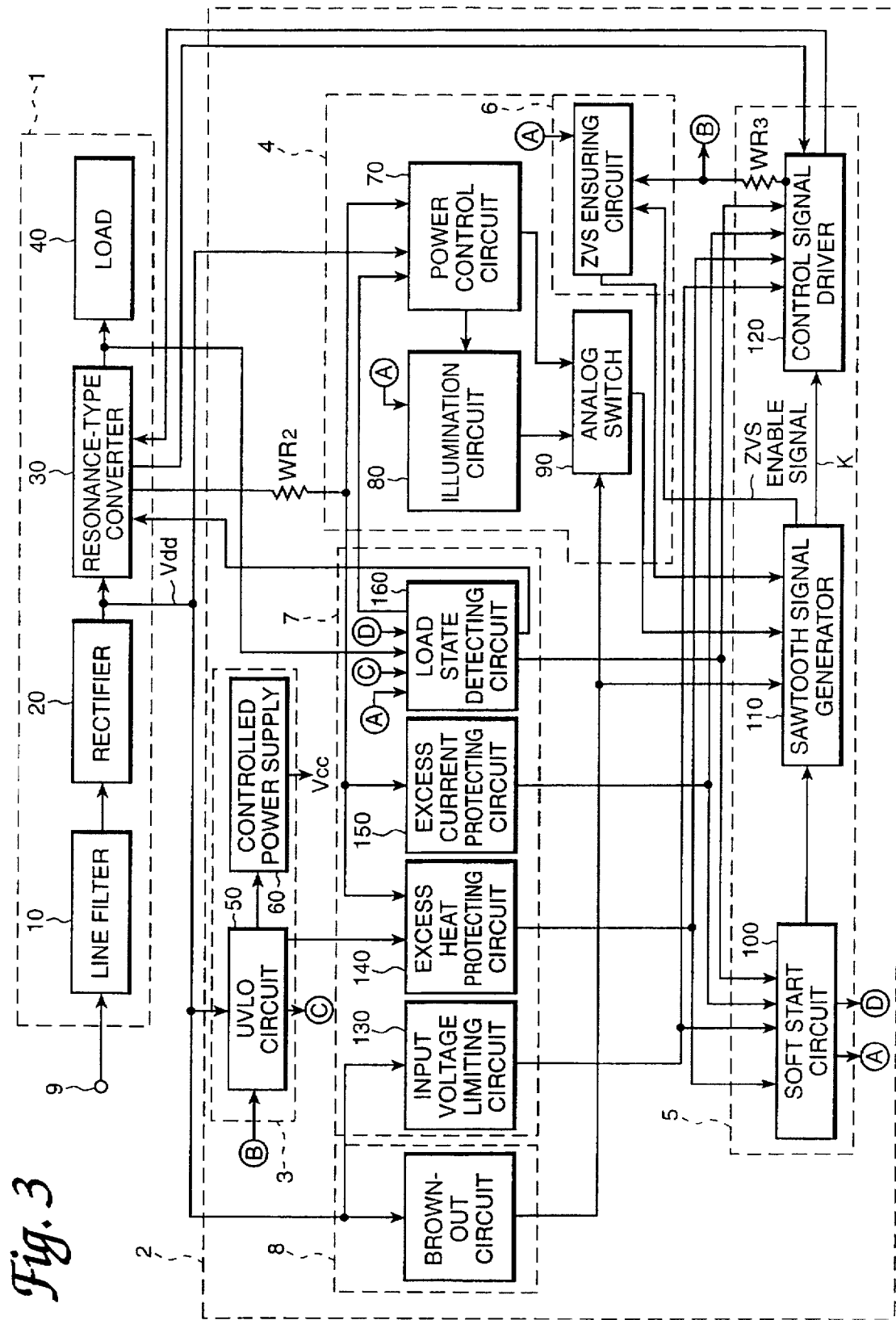
FIG. 3 is a block diagram showing an electronic ballast of the present invention.

FIG. 3 is a block diagram showing an electronic ballast of the present invention. The electronic ballast comprises main power device 1 including AC input terminal 9, line filter 10, a rectifier 20, a resonance mode converter 30 and a load 40, and a zero voltage switching controller 2 including a control power portion 3, power control portion 4, drive signal generator 5, zero voltage switching ensuring portion 6, protection circuit portion 7 and brownout circuit 8. Thus, an alternating voltage input is rectified and switched using a high frequency signal so that power can be effectively supplied to load 40. Control power portion 3 includes undervoltage lock-out (UVLO) circuit 50 and controlled power supply 60 and supplies an operating voltage (Vcc) to ZVS control device 2. Drive signal generator 5 includes soft start circuit 100, sawtooth wave signal generator 110 and control signal driver 120, and generates a drive signal for driving the switching element of resonance type converter 30. Power control portion 4 includes power control circuit 70, illumination circuit 80 and analog switch 90, and senses changes in the input power applied thereto and the power applied to the load and ambient illumination so as to output a control current for controlling the oscillating frequency of sawtooth wave signal generator 110. ZVS ensuring circuit 6 controls dead time (that is, a time period where all switching elements are turned off) so that the switching element of resonance type converter 30 can perform zero voltage switching. Brownout circuit 8 shuts down the output of power control portion 4 so as to stop the control operation when the input voltage is intentionally lowered for the purpose of saving energy. Thus, as the input voltage is lowered, the electric power applied to load 40 is also lowered.

The operation of, ZVS controller 2 will now be described with reference to FIG. 3. Output voltage Vdd of rectifier 20 is initially input to ZVS controller 2, to thereby enable control power portion 3 therein to supply operating voltage Vcc to ZVS controller 2. Once resonance type converter 30 operates normally, energy derived from resonance type converter 30 to control signal driver 120 is input so that Vcc can be provided by control power portion 3. That is, UVLO circuit 50 of control power portion 3 maintains a lock-out state, until the voltage input to ZVS controller 2 becomes higher than a predetermined voltage, so as to prevent controlled power supply 60 from outputting Vcc. When the input voltage is higher than a predetermined voltage, the lock-out condition ends so that controlled power supply 60 can output Vcc. Once Vcc is applied to ZVS controller 2, the controller operates normally. Thus, resonance type converter 30 operates normally, and control power supply 60 outputs Vcc by the voltage derived from resonance type converter 30. If an abnormal condition occurs, which makes protection circuit portion 7 output a shutdown signal. Thus, resonance mode converter 30 does not operate normally, then, there is no current output to ZVS controller 2. Thus, the input voltage of control power 3 is lowered, and UVLO circuit 50 is locked out. As a result, Vcc is temporarily shut down for all circuits except excess current protection circuit 150 and UVLO circuit 50.

A sawtooth oscillating frequency Fsw of sawtooth wave signal generator 110 becomes higher than the normal state frequency due to soft start circuit 100 of drive signal generator 5. Thus, the voltage applied to a load (fluorescent lamp) is initially lowered, which enhances the durability of the load. That is, when power is applied for the first time, and when a normal state is restored after protection circuit 7 senses the abnormal state and outputs a shutdown signal, soft start circuit 100 outputs an operation stop signal to load state detection circuit 160, power portion 4 and ZVS ensuring circuit 6 so as to stop the control operation. Then, soft start circuit 100 controls sawtooth wave signal generator 110 to generate a sawtooth having a frequency higher than that of the normal state. Thus, a small amount of current flows through a filament prior to the discharge of the load (lamp) for preheating. Accordingly, the shutdown output signals of input voltage limiting circuit 130, excess heat protection circuit 140, excess current protection circuit 150 and load state detection circuit 160 of protect circuit portion 7 are provided to control signal driver 120 and soft start circuit 100.

Sawtooth wave signal generator 110 receives the outputs of soft start circuit 100, analog switch 90, zero voltage switching ensuring circuit 6 and brownout circuit 8 so as to generate a sawtooth wave signal which is then compared with a reference voltage. As a result, a zero voltage switching (ZVS) enable signal and a driving pulse K are output.

Control signal driver 120 receives driving pulse K from sawtooth wave signal generator 110 and outputs a drive signal for switching the switching element of resonance type converter 30. At this time, control signal driver 120 does not generate a drive signal when at least one shutdown signal is input from input voltage limiting circuit 130, excess heat protection circuit 140, excess current protection circuit 150 or load state detection circuit 160. Thus, control signal driver 120 protects the system by stopping a switching, and outputs a drive signal again when the state returns to normal.

Power control circuit 70 of power control portion 4 receives a voltage from resonance mode converter 30 via resistor $WR_2$, and input information for the load state from load state detection circuit 160, and an output of rectifier 20 so as to sense a change in the input voltage to the load and output a control current. Illuminating circuit 80 senses ambient illumination and controls the voltage applied to load 40 so as to output a control current so that optimum illumination can be maintained. Analog switch 90 outputs to sawtooth wave signal generator 110 the control currents received from illuminating circuit 80 and power control circuit 70 in the normal state so as to control the sawtooth oscillating frequency.

Brownout circuit 8 shuts down analog switch 90 when an input voltage falls below a predetermined voltage. Thus, control current stops flowing, and brownout circuit 8 directly controls sawtooth wave signal generator 110 so that sawtooth wave signal generator 110 can oscillate at a predetermined frequency. When the input voltage is lowered, the electric power applied to the load is also lowered to save energy.

Input voltage limiting circuit 130 senses an input voltage being higher than twice a rated voltage or lower than half the rated voltage, and outputs a shutdown signal. Excess heat protection circuit 140 outputs a shutdown signal so as to protect a switching element of resonance type converter 30 from becoming overheated. Excess current protection circuit 150 outputs a shutdown signal so as to prevent a switching element of resonance mode converter 30 from excessive current. Load state detection circuit 160 senses a no-load state so as to output a shutdown signal, and shuts down a switch on the no-load side or senses a load state when two loads are employed. Thus, switches SW1 and SW2 of resonance type converter 30 are controlled.

Figure 4:
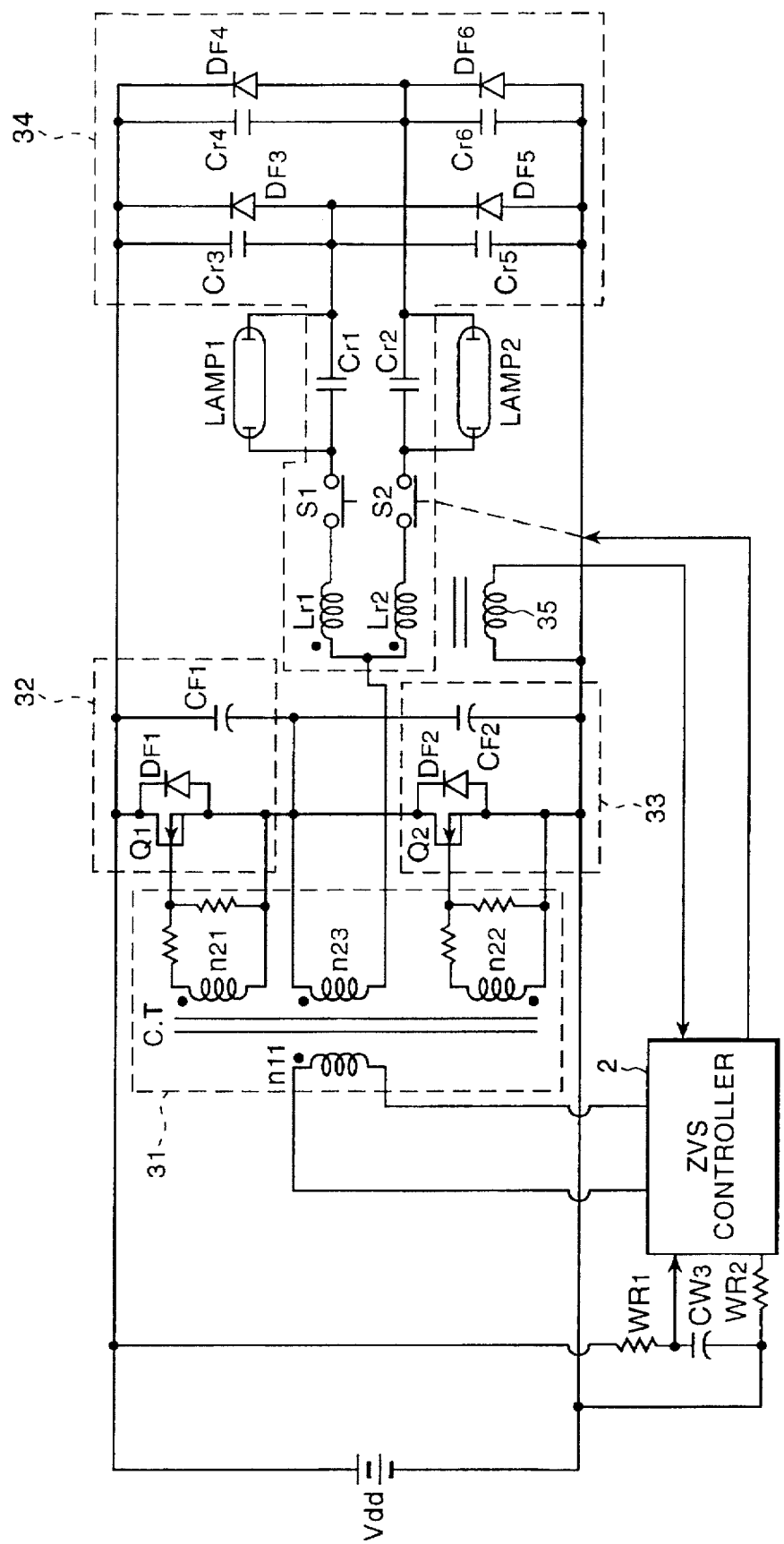
FIG. 4 is a schematic circuit of illustrating the main power device of FIG. 3.

FIG. 4 is a schematic circuit of the main power device 1 shown in FIG. 3. A commercial AC voltage input via line filter 10 is rectified by rectifier 20, and a DC voltage Vdd is output. Resonance type converter 30 of the device shown in FIG. 4 comprises control transformer 31 for connecting ZVS controller 2 to resonance type converter 30, a first switching portion 32, whose gate is connected to a secondary winding n21 of control transformer 31 and whose drain is connected to the positive output (Vdd) of rectifier 20, a second switching portion 33, whose gate is connected to a secondary winding n22 of control transformer 31 and whose drain is connected to the negative output of rectifier 20, and a resonance circuit portion 34 connected to a guide winding n23 of control transformer 31. Resonance type converter 30 delivers the stable electric power to loads (lamps 1 and 2)

As shown in FIG. 4, control transformer 31 of the resonance mode converter includes a control winding n11 connected to an output of ZVS controller 2, first switching winding n21 connected to a first switching portion 32, second switching winding n22 connected to a second switching portion 33, and guide winding n23 connected to resonance circuit portion 34. First switching winding n21 and second switching winding n22 are wound to have opposing polarities. First switching portion 32 includes FET $Q_1$, whose gate is connected to first switching winding n21 of transformer 31, and diode $D_{F1}$ and capacitor $C_{F1}$ each connected in parallel across the source/drain of FET $Q_1$. Second switching portion 33 includes FET $Q_2$, whose gate is connected to second switching winding n22 of transformer 31, and diode $D_{F2}$ and capacitor $C_{F2}$ each connected in parallel across the source/drain of FET $Q_2$. Resonance circuit portion 34 is constituted by two load resonant portions. A first load resonant portion includes resonant coil $L_{r1}$ connected to one side of guide winding n23, whose other side is connected in series to the common nodes of first and second switching portions 32 and 33, a resonant capacitor $C_{r1}$, a capacitor $C_{r3}$ and a diode $D_{F3}$ respectively connected in parallel to each other between resonant capacitor $C_{r1}$ and the positive terminal of Vdd, a capacitor $C_{r5}$ and diode $D_{F5}$ respectively connected in parallel to each other between resonant capacitor $C_{r1}$ and the negative terminal of Vdd. A second load resonant portion includes a resonant coil $L_{r2}$ connected to the one side of guide winding n23, a resonant capacitor $C_{r2}$, a capacitor $C_{r4}$ and a diode $D_{F4}$ respectively connected in parallel to each other between resonant capacitor $C_{r2}$ and the positive terminal of Vdd, a capacitor $C_{r6}$ and diode $D_{F6}$ respectively connected in parallel to each other between resonant capacitor $C_{r2}$ and the negative terminal of Vdd. Thus, resonance circuit portion 34 delivers electric power to two loads (lamp 1 and lamp 2). Diodes $D_{F3}$ to $D_{F6}$ clamp the voltages of capacitors $C_{r3}$ to $C_{r6}$ when the overall system operates abnormally and the voltages of capacitors $C_{r3}$ to $C_{r6}$ are higher than DC voltage Vdd. In addition, current flowing through lamps 1 and 2 includes a corresponding current in detecting transformer 35, provided 35 for detecting the current of current flowing through resonant coils $L_{r1}$ and $L_{r2}$. The current induced in detecting transformer 35 is input to load state detection circuit 160 of ZVS controller 2. Load state detection circuit 160 supplies or shuts down the power to lamps 1 and 2 by turning switches SW1 and SW2 on and off depending on the load state.

Figure 5:
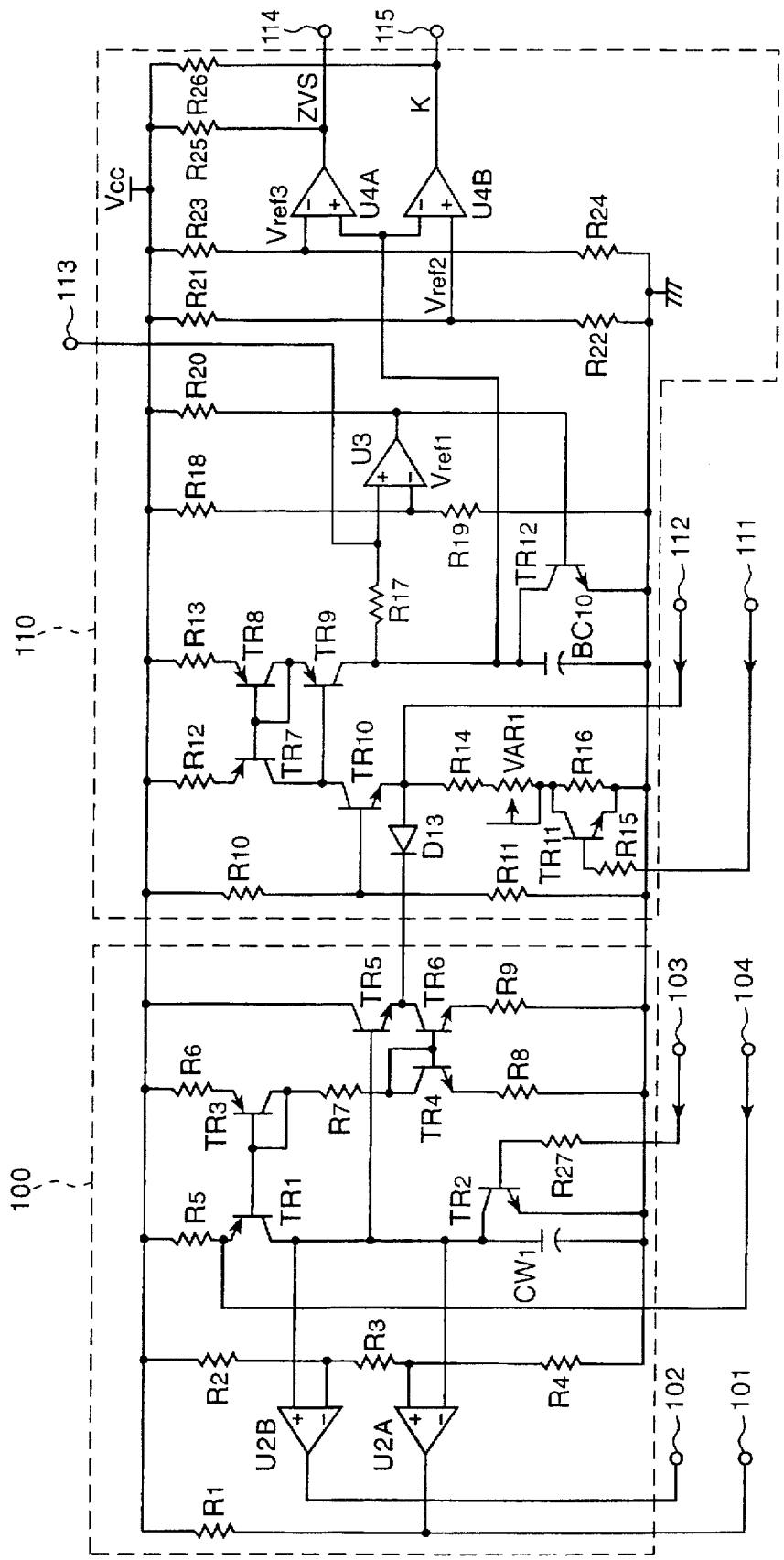
FIG. 5 is a schematic circuit of illustrating the soft start circuit and the sawtooth wave signal generating circuit shown in FIG. 3.

FIG. 5 is a schematic circuit illustrating the soft start circuit 100 and the sawtooth wave signal generating circuit 110 shown in FIG. 3. When an input voltage Vdd of ZVS controller 2 exceeds a threshold voltage, and thus the lockout state of UVLO circuit 50 is removed, soft start circuit 100 starts operation so as to make the oscillation frequency of sawtooth wave signal generating circuit 110 higher than the normal frequency. Sawtooth wave signal generating circuit 110 generates a sawtooth wave according to a control current, compares the sawtooth wave with a reference voltage and outputs a driving pulse K and a ZVS enable signal.

As shown in FIG. 5, diode $D_{13}$ between an output of soft start circuit 100 and sawtooth wave signal generating circuit 110 is turned on until the voltage across capacitor $CW_1$ of soft start circuit 100 becomes the same as that across a resistance combination $(R_{14}+VAR_1+R_{15})$ of sawtooth wave signal generating circuit 110. At the moment when the voltage of capacitor $CW_1$ starts increasing, diode $D_{13}$ stops conducting. In other words, from that moment, soft start circuit 100 and sawtooth wave signal generating circuit 110 are shut down. Accordingly, when an initial source power having no charged voltage is applied to capacitor $CW_1$ (an initial driving) and when the system is shut down by an abnormal state during system operation and recovered to a normal state, a soft start is performed as follows. A shutdown signal is input from excess current protection circuit 150, load state detection circuit 160, excess heat protection circuit 140 and input voltage limiting circuit 130 via terminal 103. Then, transistor $TR_2$ is turned on so as to discharge the high-capacity capacitor $CW_1$. Thus, a soft start is performed again. In addition, a control signal is input from excess heat protection circuit 140 to terminal 104 so that the current flowing through static current sources $TR_1$ and $TR_3$ is limited at a low temperature. Thus, the time period for charging capacitor $CW_1$ is delayed. Soft start time period is prolonged at low temperatures, which makes the preliminary heating time sufficiently long. Thus, lamp life shortening caused by an initial rush of current can be prevented. A comparator U2A outputs, by detecting the soft start operation, a power on reset (POR) signal for performing a reset when the relatively unimportant abnormal state occurs and the power is continuously provided to load state detection circuit 160 via terminal 101. A comparator U2B outputs a disable signal to power controller 4 and zero voltage ensuring circuit 6 via terminal 102 during soft start circuit 100 operation, so that a control operation cannot be performed. That is, in the soft start step, the provided electrical power has to be intentionally low for the preliminary heating of the load. Thus, the control circuit operates so that the electrical power provided to the load cannot be increased.

The time period for operating soft start circuit 100 can be expressed by resistor $R_7$ and capacitor $CW_1$, as follows.

$$T_{ss} = \frac{CW_1 \times V_{th}}{I_{c1}} \quad (1)$$

Here, $V_{th}$ is a reference voltage of comparator U3, $I_{c1}$ is the current flowing to capacitor $CW_1$, and $T_{ss}$ is the soft start time, for example, several milliseconds.

For the case of a discharge lamp whose load is the same as that of a fluorescent lamp, soft start circuit 100 generates a sawtooth wave at a frequency higher than the switching frequency of the power switching element in a normal state so as to prevent discharge rush current and voltage discharge. Thus, the lamp filament is preliminarily heated so as to lengthen the life of the lamp.

In sawtooth wave signal generating circuit 110, when the static current flows to capacitor $BC_{10}$ by the mirror-type static current source, constituted by transistors $TR_7$ and $TR_8$, the charge voltage of capacitor $BC_{10}$ increases along a regular slope. When the voltage of capacitor $BC_{10}$ reaches the reference voltage ($V_{ref1}$) of comparator U3, the output of comparator U3 becomes "high." Thus, transistor $TR_{12}$ is turned on, and capacitor $BC_{10}$ is instantaneously discharged. When the load of capacitor $BC_{10}$ is completely discharged, the current from the static current source re-charges capacitor $BC_{10}$. When the voltage of capacitor $BC_{10}$ reaches reference voltage ($V_{ref1}$) of comparator U3 again, the process for discharging capacitor $BC_{10}$ voltage is repeated so that a sawtooth wave can be generated continuously. In sawtooth wave signal generating circuit 110, an oscillating frequency of the sawtooth wave can be expressed as follows.

$$F_{SW} = \frac{I_{c2}}{V_{th} \times BC_{10}} \quad (2)$$

Here, $I_{c2}$ is current flowing to the capacitor, $V_{th}$ is reference voltage $V_{ref1}$ of comparator U3, $BC_{10}$ is the capacitance of capacitor $BC_{10}$ and $F_{sw}$ is the sawtooth wave oscillating frequency.

Meanwhile, an input voltage of resonance-type converter 30 and a control voltage for compensating the change of load electricity are input from analog switch 90 of electrical power control 4 via terminal 112. Then, the current flowing through capacitor $BC_{10}$ is varied so as to control the sawtooth wave oscillating frequency. In other words, the electrical power delivered to the load of a resonance-type converter is low when the switching frequency of first and second switching portions in resonance type converter 30 is high, while the electrical power is high when the switching frequency is low. Accordingly, the switching frequency is controlled so as to provide constant electrical power to the load despite the change of load and input voltage, to thereby make lamp illumination regular. However, the switching frequency changes in proportion to oscillating frequency ($F_{SW}$) of sawtooth wave signal generating circuit 110, and sawtooth wave oscillating frequency $F_{SW}$ can be varied by current $I_{c2}$ flowing through $BC_{10}$, as shown in expression (2). Therefore, the electrical power applied to the load can be controlled by controlling current $I_{c2}$ flowing through $BC_{10}$. Meanwhile, when an input voltage is low and a control signal is input from brownout circuit 8 via terminal 111 so as to cause transistor $TR_{11}$ to conduct, the current flowing through transistor $TR_{10}$ is increased. Thus, the shock caused when brownout circuit 8 shuts down a control current of electrical power control circuit 4 can be alleviated, and constant current can flow. In addition, an output of zero voltage switching ensuring circuit 6 is input via terminal 113 so as to provide capacitors $C_{F1}$ and $C_{F2}$ (FIG. 4) of resonance type converter 30 with a sufficient discharging time period. Thus, an input voltage of comparator U3 is controlled so as to make the switching voltage zero. As a result, an amplitude of the sawtooth wave is increased, which prolongs the dead time.

The thus-generated sawtooth wave signal is input to the inverting input of a comparator U4B and compared with reference voltage $V_{ref2}$ input to the non-inverting input of comparator U4B. Thus, the drive signal for driving electrical power switching elements $Q_1$ and $Q_2$ of resonance type converter and driving pulse (K) for determining the dead time are output to control signal generator 120 via terminal 115. The dead time has to be varied according to the value of elements $L_{r1}$, $L_{r2}$, $C_{r2}$, $C_{r3}$, $C_{r4}$, $C_{r5}$ and $C_{r6}$ shown in FIG. 4 that determine the natural resonant frequency of resonance type converter 30. Therefore, reference voltage $V_{ref2}$ of sawtooth wave comparator U4B also must vary. Meanwhile, the sawtooth wave signal is input to the non-inverting input of a comparator U4A and compared with reference voltage $V_{ref3}$ input to the inverting input of comparator U4A. Thus, a zero voltage switching (ZVS) enable signal is input to zero voltage switching ensuring circuit 6 via terminal 114. In FIG. 5, reference symbols $R_1$ to $R_{27}$ are voltage distribution resistors.

FIG. 6A to FIG. 6E illustrate waveforms during the operation of the sawtooth wave signal generating circuit shown in FIG. 5. FIG. 6A illustrates the waveform of the sawtooth wave signal generated when capacitor $BC_{10}$ is charged by the constant current source flowing through capacitor $BC_{10}$ and promptly discharged when an output of comparator U3 is high. FIG. 6B illustrates the output waveform of comparator U3, that is, when the pulse signal generated when the charge voltage of capacitor BC1O exceeds reference voltage ($V_{ref1}$). FIG. 6C illustrates the sawtooth wave signal of FIG. 6A and reference voltages $V_{ref2}$ and $V_{ref3}$. FIG. 6D illustrates a driving pulse (K) which is low when the sawtooth wave signal is higher than reference voltage $V_{ref2}$ in FIG. 6C and which is high when the sawtooth wave signal is lower than reference voltage $V_{ref2}$. FIG. 6E illustrates ZVS enable signal which is high when the sawtooth wave signal is higher than reference voltage $V_{ref3}$ and low when the sawtooth wave signal is lower than reference voltage $V_{ref3}$, as compared with the sawtooth wave and reference voltage $V_{ref3}$ of FIG. 6C.

Figure 7:
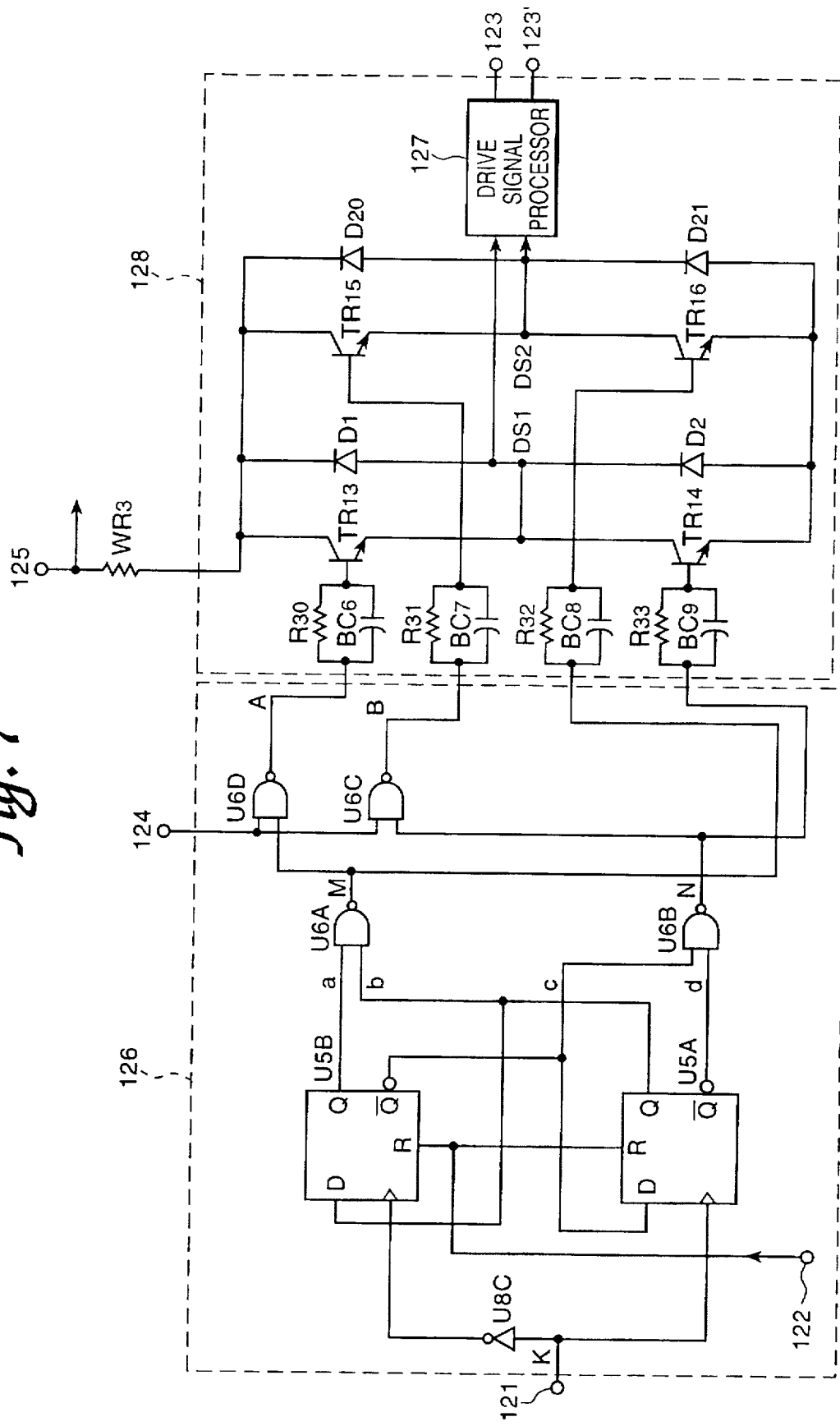
FIG. 7 is a schematic circuit of the control signal driver of FIG. 3.

FIG. 7 is a circuit diagram showing the control signal driver 120 of FIG. 3. Driving logic circuit 126 and driving circuit 128 receive input driving pulse signal (K) so as to output the drive signal for driving switching elements $Q_1$ and $Q_2$ of resonance-type converter.

That is, driving pulse (K) is input from sawtooth wave signal generating circuit 110 to D flip-flop U5B, via a terminal 121 and an inverter U8C, and to D flip-flop U5A, via terminal 121. Outputs a, b, c and d of D flip-flops U5A and U5B are input to NAND gates U6A and U6B so as to be respectively output as driving logic signals M and N. Then, two other driving logic signals A, B are output when driving logic signals M and N are input via NAND gates U6C and U6D together with a signal input via terminal 124 from resonance type converter 30. D flip-flops U5A and U5B are reset when at least one shut down signal is input from input voltage limiting circuit 130, excess heat protection circuit 140, excess current protection circuit 150, or load state detection circuit 160 via a terminal 122, and thus an output of the drive signal is shut down.

Driving logic signals A, B, M and N are input to the bases of four transistors $TR_{13}$, $TR_{15}$, $TR_{16}$ and $TR_{14}$ via resistor-capacitor parallel circuits ($R_{30}$, $BC_6$; $R_{31}$, $BC_7$; $R_{32}$, $BC_8$; $R_{33}$, $BC_9$), which are respectively turned on/off. Thus, the drive signal DS1-DS2 is output to a primary winding n11 of control transformer 31 of resonance-type converter 30 via terminal 123 in subtractor 127 so as to switch switching elements $Q_1$ and $Q_2$. In FIG. 7, the diodes $D_1$, $D_2$, $D_{20}$ and $D_{21}$ are used for preventing reverse current flows.

Figure 8A:
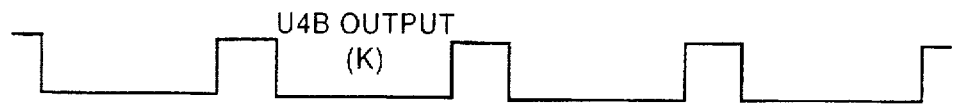
FIGS. 8A to 8L illustrate operational waveforms of the control signal driver of FIG. 7.
Figure 8B:
Figure 8C:
Figure 8D:
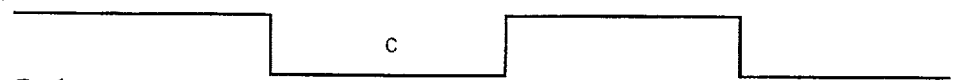
Figure 8E:
Figure 8F:
Figure 8G:
Figure 8H:
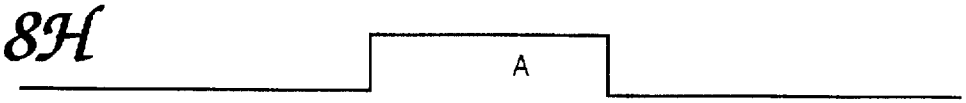
Figure 8I:
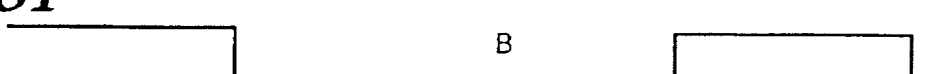
Figure 8J:
Figure 8K:
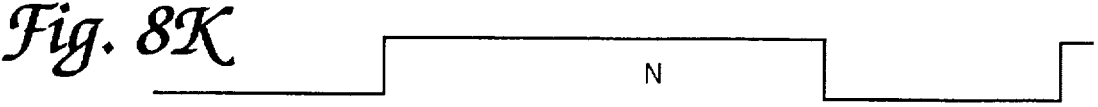
Figure 8L:
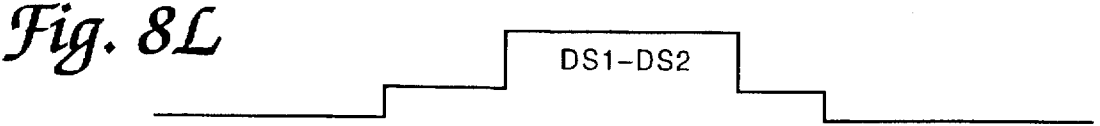

FIG. 8A to FIG. 8L illustrate operation waveforms of each part of the device shown in FIG. 7. FIG. 8A illustrates driving pulse (K) input to control signal driver 130. FIG. 8B and FIG. 8C illustrate waveforms a and b input to NAND gate U6A. FIG. 8D and FIG. 8E illustrate waveforms c and d input to NAND gate U6B. FIG. 8F and FIG. 8G illustrate output waveforms M and N of NAND gates U6A and U6B. FIGS. 8H, 8I, 8J and 8k illustrate driving logic signals A, B, M and N input to transistors $TR_{13}$, $TR_{15}$, $TR_{16}$ and $TR_{14}$. FIG. 8L illustrates drive signals DS1–DS2, i.e., the output of control signal generator driver 120.

FIG. 9A to FIG. 9F illustrate operation waveforms of the devices shown in FIG. 3 and FIG. 4. FIG. 9A illustrates the voltage between the drain and source of second switching element $Q_2$, wherein the voltage is close to zero when second switching element $Q_2$ is turned on and the voltage is near Vdd when second switching element $Q_2$ is turned off. Specifically, as shown in FIG. 9A, the slope created by capacitors $C_{F1}$ and $C_{F2}$ is gentle during rising and falling of a signal waveform. Therefore, a sudden change, which occurs in the conventional hard switching systems does not occur, and a harmonic frequency component is decreased. Thus, high frequency noise is remarkably decreased. FIG. 9B illustrates drive signals DS1–DS2 which are positive/ negative square waves with respect to the voltage value (marked by a dotted line) having a 56 KHz frequency in the present invention. FIG. 9C illustrates the resonance current ($i_r$) of the resonance circuit. FIG. 9D illustrates the current derived from resonance type converter 30 to control signal driver 120. FIG. 9E illustrates the voltage signal developed across the load. FIG. 9F illustrates the drain current of second switching element $Q_2$.

Operation of the present invention will now be explained with reference to FIG. 3 to FIG. 9F. If t=t−1, transistors $TR_{13}$ and $TR_{16}$ of FIG. 7 are turned on. If transistors $TR_{14}$ and $TR_{15}$ are turned off, the positive square signal of the drive signal of FIG. 9B flows through the primary winding of control transformer 31 via a terminal 123 and flows to terminal 123" via resistor-capacitor parallel circuits ($R_{30}$, $BC_6$; $R_{31}$, $BC_7$; $R_{32}$, $BC_8$; $R_{33}$, $BC_9$). Thus, the positive voltage is induced to the first switching winding n21 so as to turn first switching element $Q_1$ on, while the voltage is reversely applied across second switching element $Q_2$ which then is turned off. Even when first switching element $Q_1$ is turned on, the resonance current (ir) flows in the negative direction. Thus, the current flows in the inverse direction via diode $D_{F1}$. If t=t0, as the resonance current changes its direction, that is, from negative to positive, resonance current (ir) of FIG. 9C flows via first switching element $Q_1$ so as to accumulate energy. Since transistors $TR_{13}$ and $TR_{16}$ are turned on, and the resonance current (ir) flows in the positive direction, resonance current (ir), transferred from diodes $D_1$ and $D_2$ of control signal driver 120 via control transformer 31, charges capacitor $CW_3$ of control power portion 3 via resistor $WR_3$. Control power portion 3 is provided with electrical power from Vdd at early times so as to output Vcc. However, from the time when capacitor $CW_3$ is charged as described above, capacitor $CW_3$ is charged by the current shown in FIG. 9D and introduced from resonance-type converter 30, so as to be used as the Vcc power source. This is called a "powering mode" for main electrical power device 1, and a "power regeneration mode" for ZVS control device 2. If t=t1, transistor $TR_{13}$ is turned off by a drive signal, and first switching element $Q_1$ is turned off if transistor $TR_{14}$ is turned on. When first switching element $Q_1$ is turned off, resonance current (ir) charges/discharges capacitors $C_{F1}$ and $C_{F2}$ connected in parallel to first and second switching elements $Q_1$ and $Q_2$. In more detail, capacitor $C_{F1}$ is charged and capacitor $C_{F2}$ is discharged. At this time, the amount of current flowing to Vdd is the same as that coming from Vdd, and free wheeling is performed on the current, via diode $D_{21}$ and transistor $TR_{14}$, transferred to ZVS controller 2. Thus, the inductive input current shown in FIG. 9D suddenly falls to zero. In addition, as first switching element $Q_1$ is turned off and capacitor $C_{F2}$ is discharged, the drain voltage of first switching element $Q_1$ shown in FIG. 9A is slowly decreased. This is called a "free resonance" mode, natural resonance frequency increases slightly as capacitors $C_{F1}$ and $C_{F2}$ are connected to resonance circuit 34. When the voltage of capacitor $C_{F2}$ falls to zero, that is, when the voltage of FIG. 9A is at ground potential, diode $D_{F2}$ conducts. Then, a power regeneration mode section for returning to Vdd, via diode $D_{F2}$, part of the energy generated in resonance circuit 34 as free wheeling is performed. The drive signal has to be changed within the section so as to perform a zero voltage switching onto second switching element $Q_2$. In other words, if t=t3, and transistors $TR_{14}$ and $TR_{15}$ of control signal driver 120 are turned on, the current flows toward the positive pole of primary winding $n_{11}$ of control transformer 31 (FIG. 4) via transistor $TR_{15}$, terminal 123' and control transformer 31, and flows to transistor $TR_{14}$ via terminal 123, to thereby turn second switching element $Q_2$ on. At this time, since the voltage on second switching element $Q_2$ is at ground potential, zero voltage switching is performed. Even though second switching element $Q_2$ is turned on, energy that remains in resonance circuit 34 is regenerated to the Vdd direction, since the direction of resonance current ir is not still converted from positive to negative. At this time, a regenerating path is diode $D_{F2}$, and free-wheeling is performed on resonance current it. Thus, an extremely small amount of resonance current remains, which means that diode $D_{F2}$ cannot conduct. Then, the section where current flows inversely via diode $D_{F2}$ is generated.

If t=t4, and when resonance current ir flows from positive to negative, the conduction time of diode $D_{F2}$ and the time for inversely flowing second switching element $Q_2$ are determined by the phase difference between the drive signal and resonance current in the t3<t<t4 section. In addition, If t=t4, and when resonance current ir flows from positive to negative, the current starts flowing via second switching element $Q_2$. The state where the energy of resonance circuit 34 is accumulated is called "powering mode." The polarity of control signal driver 120 of ZVS controller 2 is changed by control transformer 31. Thus, an inductive input current charges capacitor $CW_3$ (FIG. 10) of control power portion 3 via diodes $D_2$ and $D_{20}$. If t=t5, transistor TR16 of control signal driver 120 is turned on. When transistor $TR_{15}$ is turned off, second switching element $Q_2$ is turned off, to thereby charge/discharge capacitors $C_{F1}$ and $C_{F2}$ of main power device 1. If t=t6, when capacitor $C_{F2}$ charges Vdd, the inverse parallel diode $D_{F1}$ is conducted to capacitor $C_{F1}$. Thus, the energy of resonance circuit 34 is regenerated by power Vdd. Transistor $TR_{13}$ of control signal driver 120 has to be turned on in order to perform a zero voltage switching on first switching element $Q_1$. However, even though transistors $TR_{13}$ and $TR_{16}$ are turned on, resonance current ir flows in the negative direction, resonance current ir inversely flows through first switching element $Q_1$ until t equals t8. Thus, the energy of the resonance current is regenerated by the power source. At this time, capacitor $CW_3$ of control power portion 3 is discharged. As described above, resonance mode converter 30 and ZVS controller 2 operate by repeating the operation from t=0 to t=t8. This operation can be expressed as follows.

TABLE <1>

| section (t) | drive signal generator |  |  |  | switching element |  | operation |
|---|---|---|---|---|---|---|---|
|  | $TR_{13}$ | $TR_{14}$ | $TR_{15}$ | $TR_{16}$ | $Q_1$ | $Q_2$ |  |
| t = t − 1 | on | off |  |  | on | off | $TR_{13}$ is on, $TR_{14}$ is off, $Q_1$ is on |
| t − 1 < t < t0 | on | off | off | on | on | off | current flows reversely via $Q_1$ |
| t = t0 |  |  |  |  | on | off | current starts flowing fowardly via $Q_1$ |
| t0 < t < t1 | on | off | off | on | on | off | energy supply to resonance circuit: powering mode |
| t = t1 | off | on |  |  | off | off | $TR_{13}$ is off, $TR_{14}$ is on, $Q_1$ is off |
| t1 < t < t2 | off | on | off | on | off | off | $C_{F1}$ is charged and $C_{F2}$ is discharged in resonance mode converter |
| t = t2 |  |  |  |  | off | off | voltage across $C_{F2}$ is zero after discharge |
| t2 < t < t3 | off | on | off | on | off | off | $Q_2$: zero voltage |
| t = t3 |  | on | off | off | off | on | $TR_{15}$ is on, $TR_{16}$ is off, $Q_2$ is on |
| t3 < t < t4 | off | on | on | off | off | on | current flows reversely via $Q_2$ |
| t = t4 |  |  |  |  | off | on | current starts flowing fowardly via $Q_2$ |
| t4 < t < t5 | off | on | on | off | off | on | energy accumulation into resonance circuit: powering mode |
| t = t5 |  |  | off | on | off | off | $TR_{15}$ is off, $TR_{16}$ is on, $Q_2$ is off |
| t5 < t < t6 | off | on | off | on | off | off | $C_{F1}$ is discharged, $C_{F2}$ is charged in resonance mode converter |
| t = t6 |  |  |  |  | off | off | voltage across $Q_1$ is zero due to the completion of $C_{F1}$ discharge and $C_{F2}$ charge |
| t6 < t < t7 | off | on | off | on | off | off | zero voltage section of $Q_1$ |
| t = t7 | on | off |  |  | on | off | $TR_{13}$ is on, $TR_{14}$ is off, $Q_1$ is on (t7 = t 1) |
| t7 < t < t8 | on | off | off | on | on | off | current flows reversely via $Q_1$ |
| t = t8 |  |  |  |  | on | off | current starts flowing fowardly via $Q_1$ (t8 = t0) |

As shown in Table <1>, the voltage across switching elements $Q_1$ and $Q_2$ is switched according to a drive signal at zero voltage. Therefore, an additional radiation plate is not necessary since there hardly is a heat loss caused by switching elements $Q_1$ and $Q_2$. In other words, as shown in FIGS. 9A and 9F, there is no section where the drain voltage overlaps the drain current. Therefore, the switching element does not consume energy itself, which greatly enhances energy efficiency. In addition, as shown in FIG. 9A, the voltage across the switching element is gradually increased and decreased by the charge/discharge of the capacitor. Thus, noise from second harmonics is very low, which contributes to great EMI characteristics.

Figure 10:
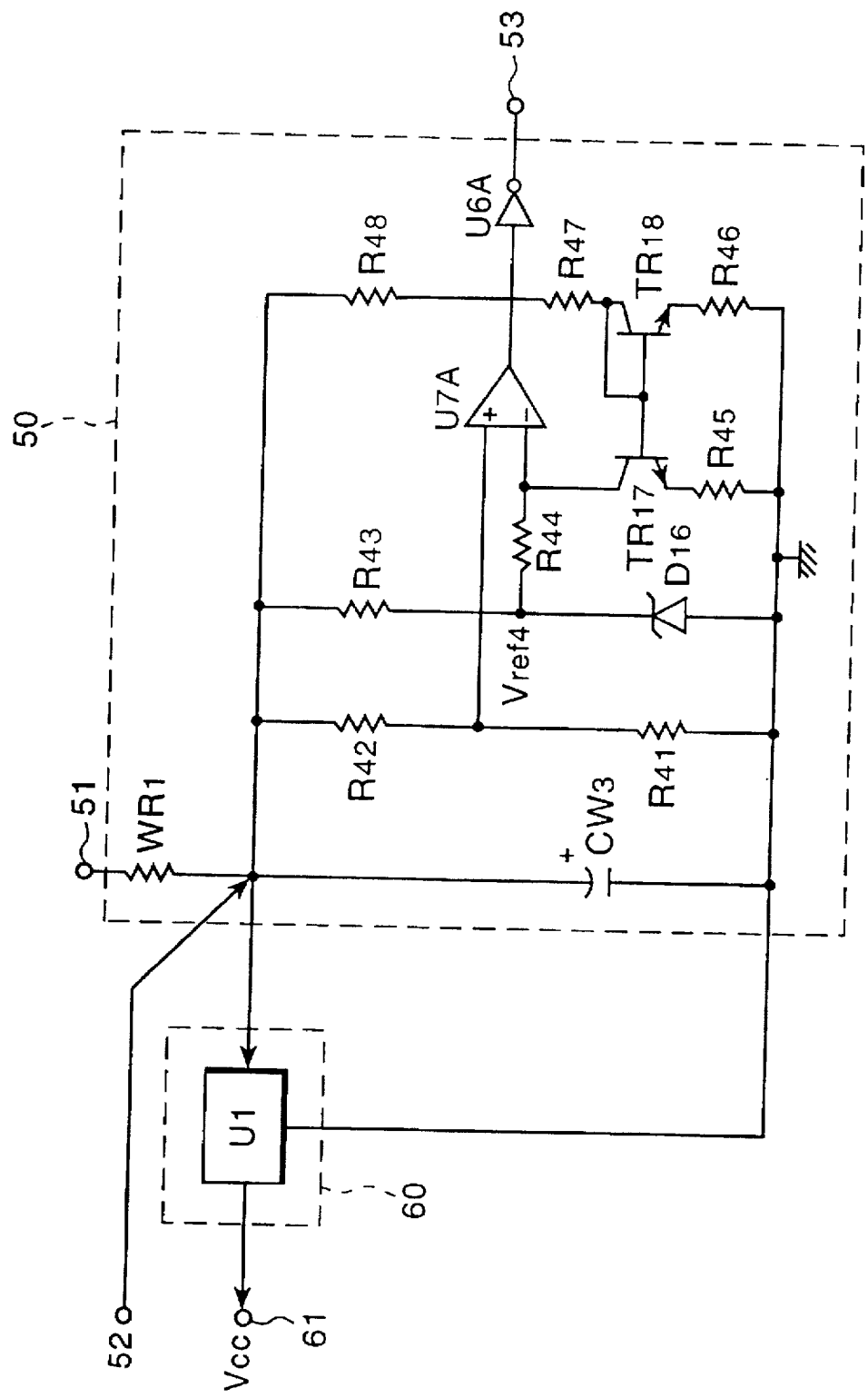
FIG. 10 is a schematic circuit showing the control power portion of FIG. 3.

FIG. 10 is a circuit diagram of the control power portion shown in FIG. 3. The control power portion comprises an UVLO circuit 50 and controlled power supply 60 so that DC voltage Vdd input from rectifier 20 can be converted into operating voltage Vcc and then supplied to ZVS controller 2. DC voltage Vdd is derived from an AC voltage input to rectifier 20 constituted of diodes (not shown). Capacitor $CW_3$ is charged by the DC voltage Vdd via an input terminal 51 and resistance $WR_1$. At this time, the voltage of capacitor $CW_3$ increases along a regular slope by the flowing current. When the voltage of capacitor $CW_3$ reaches reference voltage ($V_{ref4}$) of comparator U7A, a lock-out condition is released. Thus, voltage is applied to power source Vcc of ZVS controller 2. Meanwhile, as a resonance current starts its regeneration to ZVS controller 2 by the operation of resonance mode converter 30, the current regenerated is input to terminal 52 via resistor $WR_3$ of control signal driver 120, and then capacitor $CW_3$ is charged. Thus, the energy can be utilized as a power source of ZVS controller 2. If control signal driver 120 is shut down by protection circuit portion 7, which prevents an output drive signal, the inductive current cannot come from resonance mode converter 30. Thus, the voltage of capacitor $CW_3$ is lowered by as much as a hysteresis width of UVLO circuit 50. If the voltage of capacitor $CW_3$ is lower than reference voltage $V_{ref4}$, a lock-out occurs by comparator U7A. Thus, since power cannot be supplied, a shutdown signal is supplied to load state detecting circuit 160 via terminal 53. Accordingly, all circuits except UVLO circuit 50 and excess heat protection circuit 140 stop operating. Thus, UVLO circuit 50 re-charges capacitor $CW_3$ by employing current via resistor $WR_1$. Then, the lock-out condition is released when the voltage of capacitor $CW_3$ reaches reference voltage $V_{ref4}$ of comparator U7A, and ZVS controller 2 is provided with a power source. Here, reference symbols $R_{41}$ to $R_{48}$ are voltage distribution resistors, U6A is an inverter, $TR_{17}$ to $TR_{18}$ are transistors, $D_{16}$ is a Zener diode, and U1 is the UVLO circuit.

Figure 11:
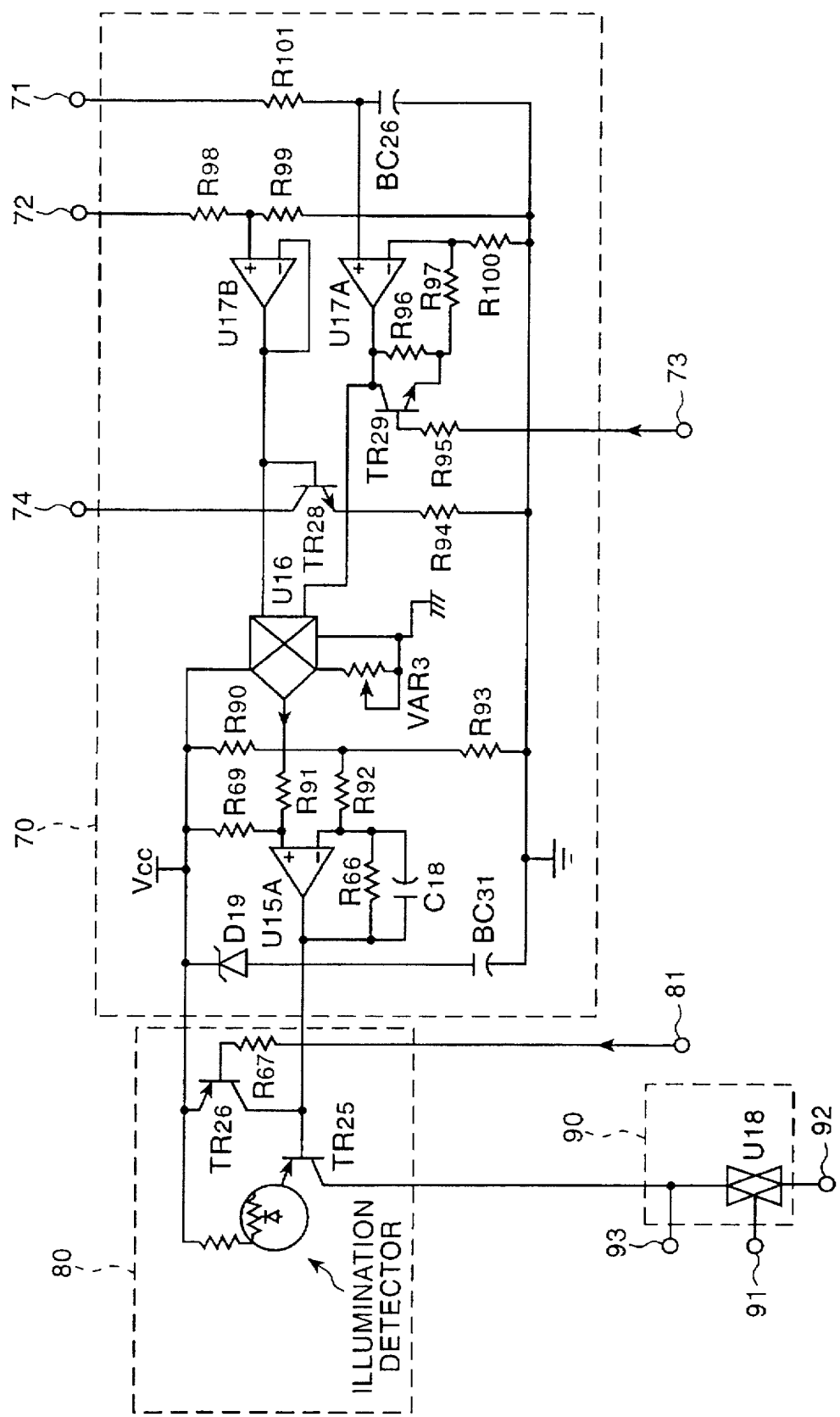
FIG. 11 is a schematic circuit showing the power control portion of FIG. 3.

FIG. 11 is a circuit diagram of power source control portion 4 shown in FIG. 3. Power source control portion 4 comprises power control circuit 70, illuminance circuit 80 and analog switch 90 so that the entire system can be controlled to be operated stably with respect to the changes in alternating current input voltage and a load. When the alternating current input changes, DC voltage Vdd input via terminal 72 is controlled by a feed forward function so as to be output to analog switch 90. When the load changes, information concerning the load is input from load state detecting circuit 160 via terminal 73 and transistor $TR_{29}$, and a current flowing through resistor $WR_2$ that detects the current flowing through resonance mode converter 30 is input via terminal 71, so that the overall system is stabilized. That is, DC voltage Vdd of resonance mode converter 30 is input to terminal 72, and an average value of the current that flows through current sensor resistor $WR_2$, connected between resonance mode converter 30 and ZVS controller 2 is input to terminal 71. Then, the input DC voltage Vdd and the average value are multiplied via comparators U17A and U17B and a multiplier U16. Then, the switching frequency of resonance mode converter 30 is controlled by employing the multiplied value so that load power can be identical with a reference power according to the state of the load input from load state detecting circuit 160 via terminal 73. Here, power control circuit 70 outputs a control signal to analog switch 90 via terminal 74. The switching frequency is controlled depending on the change of the sawtooth wave oscillating frequency Fsw, since the amount of the current delivered by an amplification degree of an error amplifier U15A, of power control circuit 70, to sawtooth wave generating circuit 110 is varied. when the entire system operates, power control circuit 70 operates at a frequency which is higher than that of normal operation due to the operation of soft start circuit 100. Therefore, an output voltage of the system is extremely low. Accordingly, a disable signal is input from soft start circuit 100 to a terminal 81 so that power control is not performed upon soft start. Then, a transistor TR$_{26}$ is operated so as to temporarily stop the power control. In other words, power control circuit 70 cannot be operated during the operation of soft start circuit 100. At the point of ending the operation of soft start circuit 100, an enable signal is input so as to re-operate the power control. Here, reference symbols R$_x$, D$_x$, VAR$_x$, TP$_x$ and BC$_x$ represent resistors, diodes, variable resistors, transistors and capacitors, respectively, in which "x" denotes corresponding subscripts.

Illumination circuit 80 detects ambient illuminance by employing an illuminance detector installed so as to be exposed to the exterior for regularly controlling an optical output, for example, to discharge it. In other words, the circuit lowers an optical output when the environmental illuminance is high, and increases an optical output when the ambient illuminance is low. Thus, a control current is output to analog switch 90 so that the optical output with respect to the environment can be maintained optimally. Therefore, when the device of the present invention is adopted for places having great illuminance changes, energy can be saved while maintaining a suitable illuminance level. Analog switch 90 receives, via terminal 93, an input supplied from terminal 74 of power control circuit 70 and outputs a control current to sawtooth wave signal generating circuit 110 via a terminal 92 of illumination circuit 80 at the normal state, and shuts down the control current when a shutdown signal is input from brownout circuit 8 via terminal 91.

FIG. 12 is a circuit diagram of zero voltage switching ensuring circuit 6 shown in FIG. 3. The zero voltage switching ensuring circuit 6 detects the current delivered to ZVS controller 2 from resonance mode converter 30 so as to control an oscillating frequency Fsw of the sawtooth wave so that switching elements Q$_1$ and Q$_2$ can constantly perform zero voltage switching. In other words, when DC voltage Vdd or the alternating current input of resonance mode converter 30 is considerably lower than that of the normal state, the switching frequency of first and second switches 32 and 33 is operated at a frequency a little higher than the natural resonance frequency so that a constant input voltage can be maintained. Thus, the amount of the resonance current flowing to load 40 is increased. When switches Q$_1$ and Q$_2$ are operated at such a switching frequency, the charging/discharging time period for capacitors C$_{F1}$ and C$_{F2}$ connected in parallel to switching elements Q$_1$ and Q$_2$ is not sufficient, and switching elements Q$_1$ and Q$_2$ may not perform zero voltage switching. Accordingly, the amount of current flowing through current sensor resistor WR$_2$ is detected to as to be input to a terminal 61. The input current is compared with a reference voltage by comparator U7B and connected to the non-inverting input of comparator U3 of sawtooth wave signal generating circuit 110 via a terminal 64. Sawtooth signal generator 110 increases an oscillating frequency of the sawtooth wave so that a zero voltage switching operation can be satisfied, thereby relatively elongating a dead time of drive signal. A control signal is input from soft start circuit 100 via terminal 62, and a ZVS enable signal is input from control signal driver 120 via terminal 63. Thus, the output timing of zero voltage switching ensuring circuit 6 can be controlled. Here, reference symbols R$_x$, TR$_x$, BC$_x$ and VAR$_x$ are resistors, transistors, capacitors and variable resistors, respectively, in which "x" denotes corresponding subscripts. Reference symbols U9B, U9C and U9D are NAND gates, and U10 is an amplifier.

FIGS. 13A to 13D illustrate operation waveforms of the device shown in FIG. 12. FIG. 13A illustrates a waveform of the current introduced from resonance mode converter 30 to terminal 61 via resistor WR$_3$, wherein the dotted line indicates a reference voltage present at the non-inverting input of comparator U7B. FIG. 13B illustrates comparator U7B output which is high when an input of FIG. 13A is higher than the reference voltage V$_{REF}$. FIG. 13C illustrates the ZVS enable signal input from control signal driver 120 via terminal 63. A sawtooth generating circuit is delayed for the amount relative to the "high" section of the waveform of the signal so as to lengthen dead time. Thus, capacitors C$_{F1}$ and C$_{F2}$ of resonance mode converter are sufficiently discharged so that zero voltage is measured across them. FIG. 13D illustrates a sawtooth generating circuit output which is delayed by the signal input from ZVS ensuring circuit 6.

Figure 14:
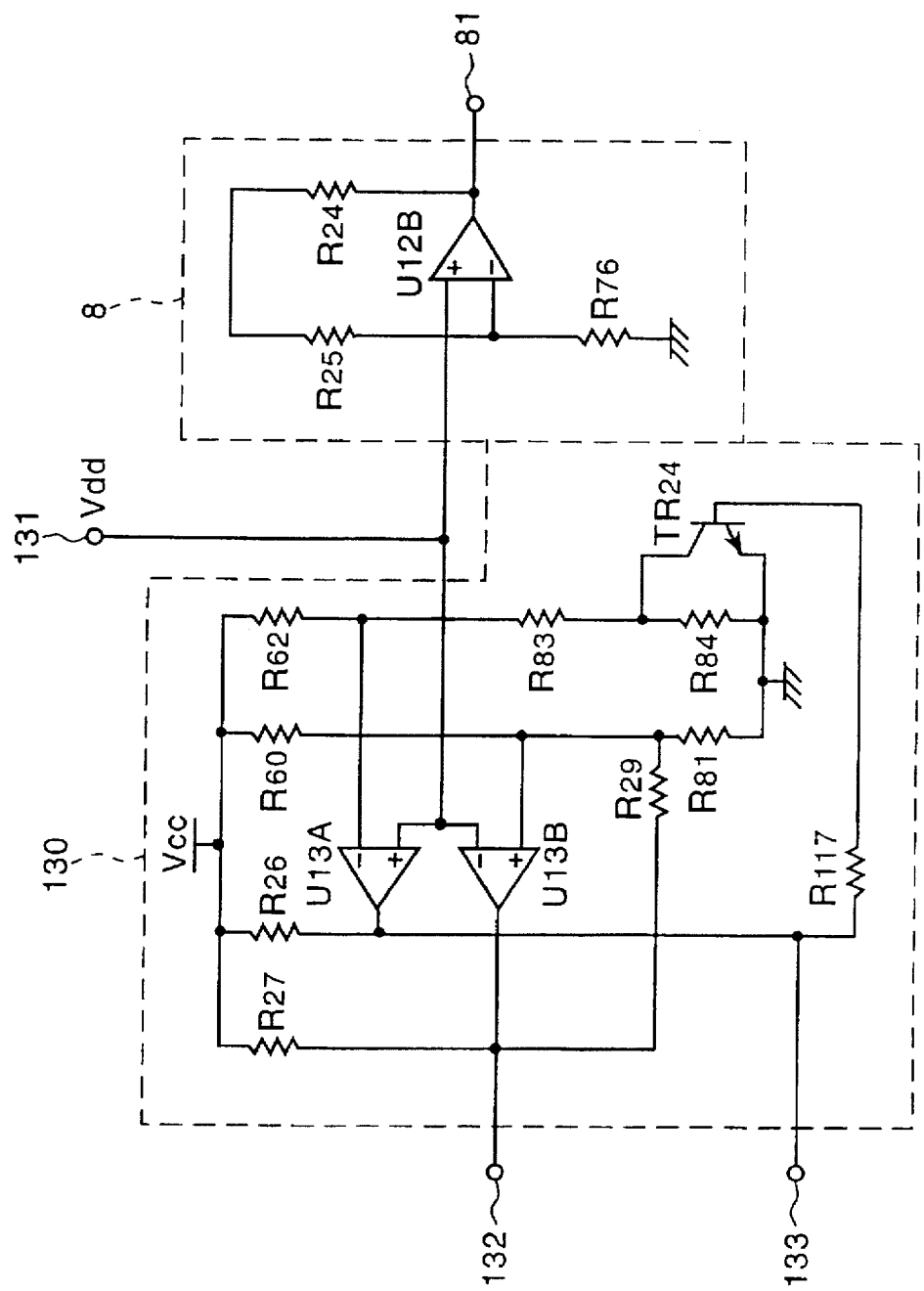
FIG. 14 is a schematic circuit showing the input voltage limiting circuit and brownout circuit shown in FIG. 3.

FIG. 14 is a circuit diagram showing input voltage limiting circuit 130 and brownout circuit 8 shown in FIG. 3. When an alternating current input voltage is considerably higher or lower than a commercial voltage, the entire system may unstably operate. Therefore, a control circuit is shut down.

Input voltage limiting circuit 130 inputs Vdd via terminal 131 and detects an excess voltage and current by employing the two comparators U13A and U13B and outputs a shutdown signal to soft start circuit 100 and control signal driver 120 via terminals 132 and 133. When input voltage is intentionally lowered for the purpose of saving energy, which is detected by brownout circuit 8, then, analog switch 90 is shut down via terminal 81, and a regular current is output to sawtooth signal generator 110. Here, reference symbols R$_x$ and TR$_x$ are resistors and transistors, respectively, wherein "x" denotes corresponding subscripts. Reference symbol U12B denotes a comparator.

Figure 15:
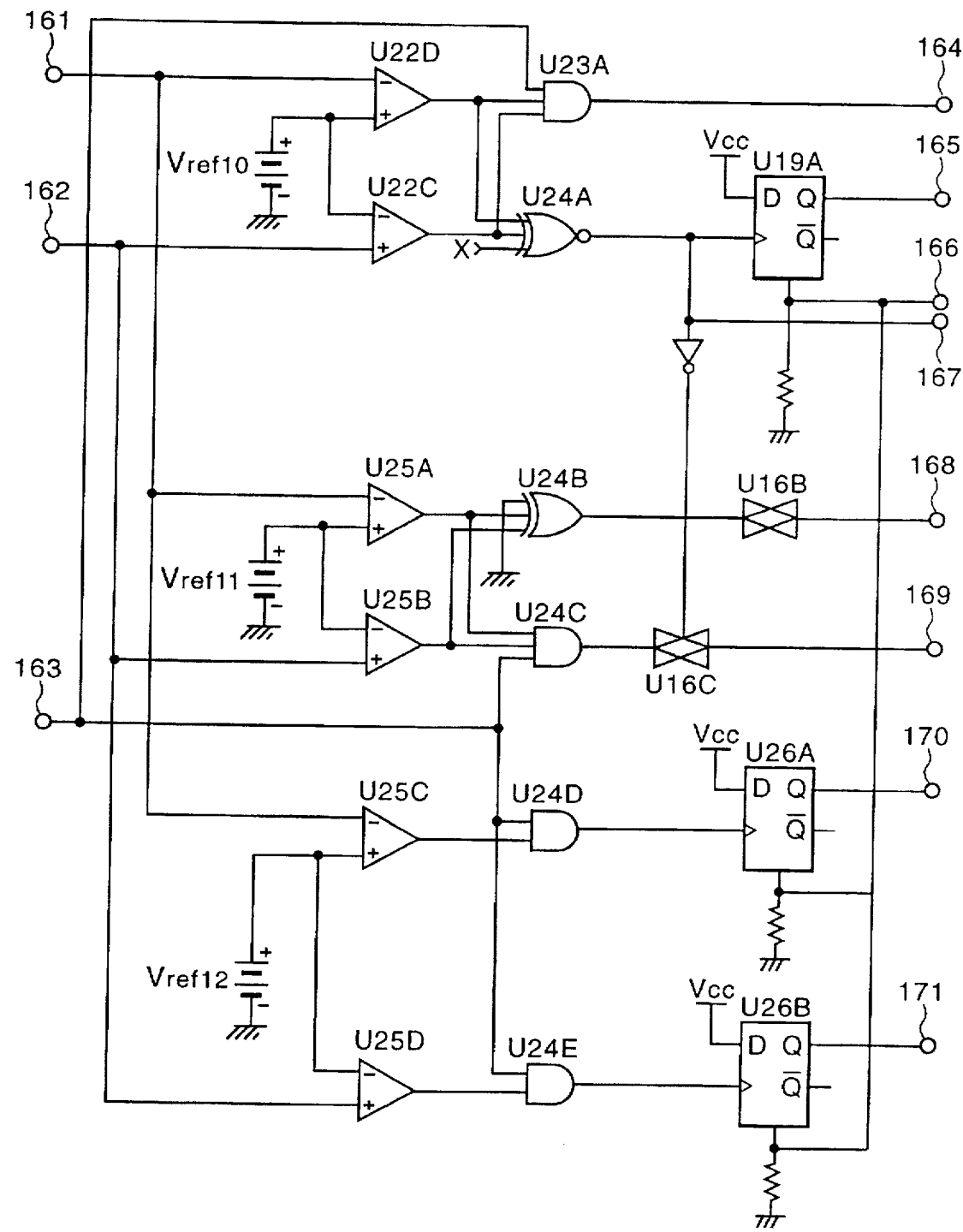
FIG. 15 is a schematic circuit showing the load state detection circuit shown in FIG. 3.

FIG. 15 is a circuit diagram of the load state detecting circuit 160 shown in FIG. 3. The circuit senses resonance current ir flowing through resonance inductors L$_{r1}$ and L$_{r2}$ so as to sense the load state. That is, induced current from resonance inductors L$_{r1}$ and L$_{r2}$ is input via terminals 161 and 162 and is sensed so as to detect whether a lamp is provided, whether the lamp is lit, a normal load and the end of the lamp's life. Then, the sensed result is output to power control circuit 70, soft start circuit 100, control signal driver 120 and resonance mode converter 30. A control signal is input from soft start circuit 100 via terminal 163, and a power on reset (POR) signal is input via terminal 166. When there is no load, a shutdown signal is output to soft start circuit 100 and control signal driver 120 via terminals 164 and 165. At this time, the load state detecting circuit 160 is latched by D flip-flop U19A. When the system returns to normal, the control device starts operating by the POR signal of soft start circuit 100 of the control device. When the lamp is not lit, load state detecting circuit 160 shuts down control signal driver 120 via terminals 168 and 169 and restarts operating control signal driver 120 after receiving a drive signal from soft start circuit 100. In addition, load state detecting circuit 160 discriminates if there are one or two lamps and outputs the result to power control circuit 70 so that the system can be operated stably. Meanwhile, load state detecting circuit 160 senses the life of each lamp, and when a lamp reaches the end of its life, load state detecting circuit 160 controls switches SW1 and SW2 of resonance mode converter via terminals 170 and 171 so as to prevent load current from flowing through the lamp that reached the end of its life. Thus, the entire system operates stably and energy can be saved. A load state is delivered to power control circuit 70 via terminal 167. In addition, the load state is compared with reference voltages $V_{ref10}$, $V_{ref11}$ and $V_{ref12}$ calculated by experimental data. Then, a suitable control considering the load state is performed. Here, reference symbols U22C, U22D and U25A–U25D represent comparators; U23A, U24C, U24D and U24E represent AND gates; U24A and U24B represent an exclusive NOR gate and exclusive OR gate, respectively; X16B and X16C represent switches; and U26A and U26B represent D flip-flops.

Figure 16:
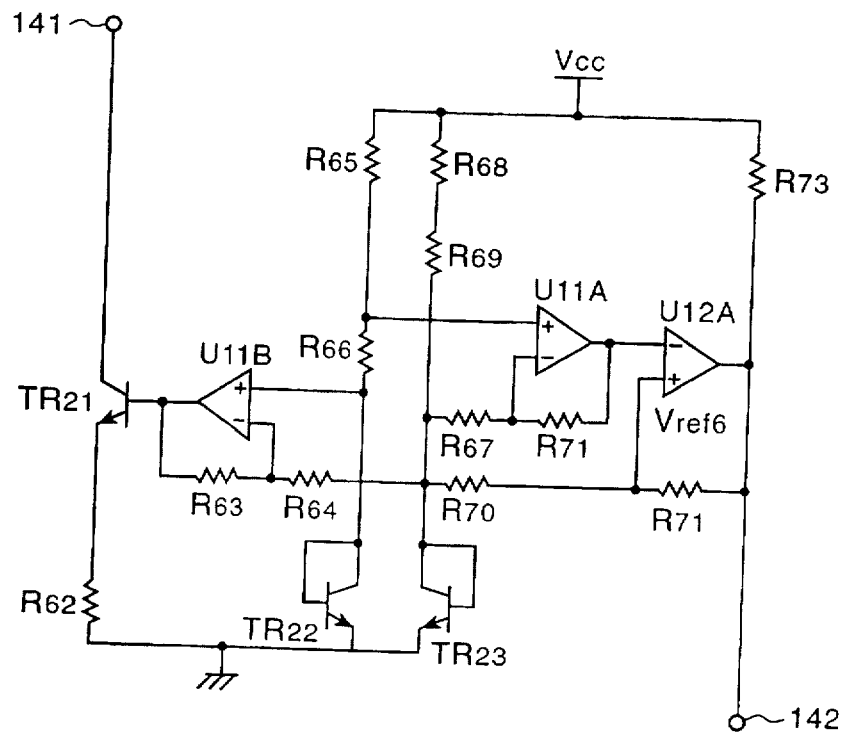
FIG. 16 is a schematic circuit showing the excess heat protection circuit of FIG. 3.

FIG. 16 is a circuit diagram of the excess heat protecting circuit 140 shown in FIG. 3. Temperature detecting diode $TR_{22}$ is installed exteriorly so as to sense the temperature of the switching element. When the switching element is excessively heated, the control circuit is shut down. In other words, temperature detecting diode, $TR_{22}$ is placed near switching elements $Q_1$ and $Q_2$ (FIG. 4) in order to prevent switching elements $Q_1$ and $Q_2$ from being increased in temperature and damaged. Thus, temperature is detected using the voltage characteristic that depends on the temperature change of the diode. If the temperature of switching elements $Q_1$ and $Q_2$ increases to be higher than a predetermined reference temperature, a shutdown signal is output to soft start circuit 100 and control signal driver 120 by comparator U12A via terminal 142. Under a protection condition, reference voltage Vref6 of comparator U12A is changed so that the reference temperature can be set lower than the initial reference temperature. Only when the switching element is lower than the reference temperature can the control circuit be normally operated. In addition, when the load is a discharge lamp, i.e., the same as a fluorescence lamp, and when the ambient temperature of the lamp is below 0° C., the life of the lamp can be fatally affected by an initial discharge rush current at a low temperature. In order to prevent this, the excess heat protection circuit has a function for sufficiently and preliminarily heating the filament of the lamp. That is, at a low temperature, a collector of transistor $TR_{21}$ is connected between resistor $R_5$ of soft start circuit 100 and an emitter of transistor $TR_1$ via terminal 141, thereby reducing amount of the current flowing to capacitor $CW_1$ that determines the soft start time. Thus, a preliminary heating time is lengthened so as to solve the initial discharge rush current problem. Here, $R_x$ and $TR_x$ represent resistors and transistors, respectively. Reference symbols $V_{ref6}$ is a reference voltage; and U11A and U11B are comparators.

Figure 17:
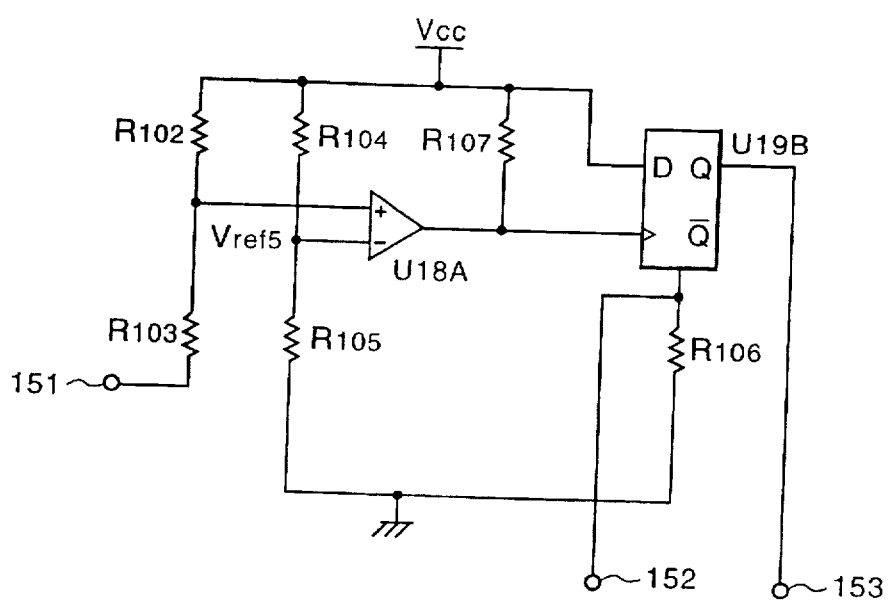
FIG. 17 is a schematic circuit showing the excess current protection circuit of FIG. 3.

FIG. 17 is a circuit diagram of the excess current protecting circuit 150 shown in FIG. 3. The circuit inputs the current flowing through resonance mode converter 30 and ZVS controller 2 to comparator U18A via resistor $WR_2$ and terminal 151, and detects, via D flip-flop U19B, when an excess current flows through switching elements $Q_1$ and $Q_2$ and outputs the detected excess current via terminal 153.

Current sensor resistor $WR_2$ is inserted between resonance mode converter 30 and ZVS controller 2 in order to prevent excess current flowing through switching elements $Q_1$ and $Q_2$. Then, an average current value is compared with reference voltage $V_{ref5}$ of comparator U18A. When the average value is higher than reference voltage $V_{ref5}$, a shutdown signal is output to soft start circuit 100 and control signal driver 120 via terminal 153. Once the shutdown signal is output, the shutdown state can be maintained even when an excess current condition is blocked due to the latched condition caused by flip-flop U19B. Thus, resonance mode converter 30 stops operating due to the shutdown operation, and there is no current delivered to ZVS controller 2. Thus, the voltage of capacitor $CW_3$ is lowered and the control circuit is locked out. When the control circuit is recovered to a normal state, UVLO circuit 50 releases the lock-out in the recovered normal state, and the latched signal is reset via terminal 152, the shutdown of the control circuit is released and a bias is applied, thereby re-operating resonance mode converter 30. In FIG. 17, $R_x$ are resistors wherein "x" denotes a corresponding subscript.

Figure 18:
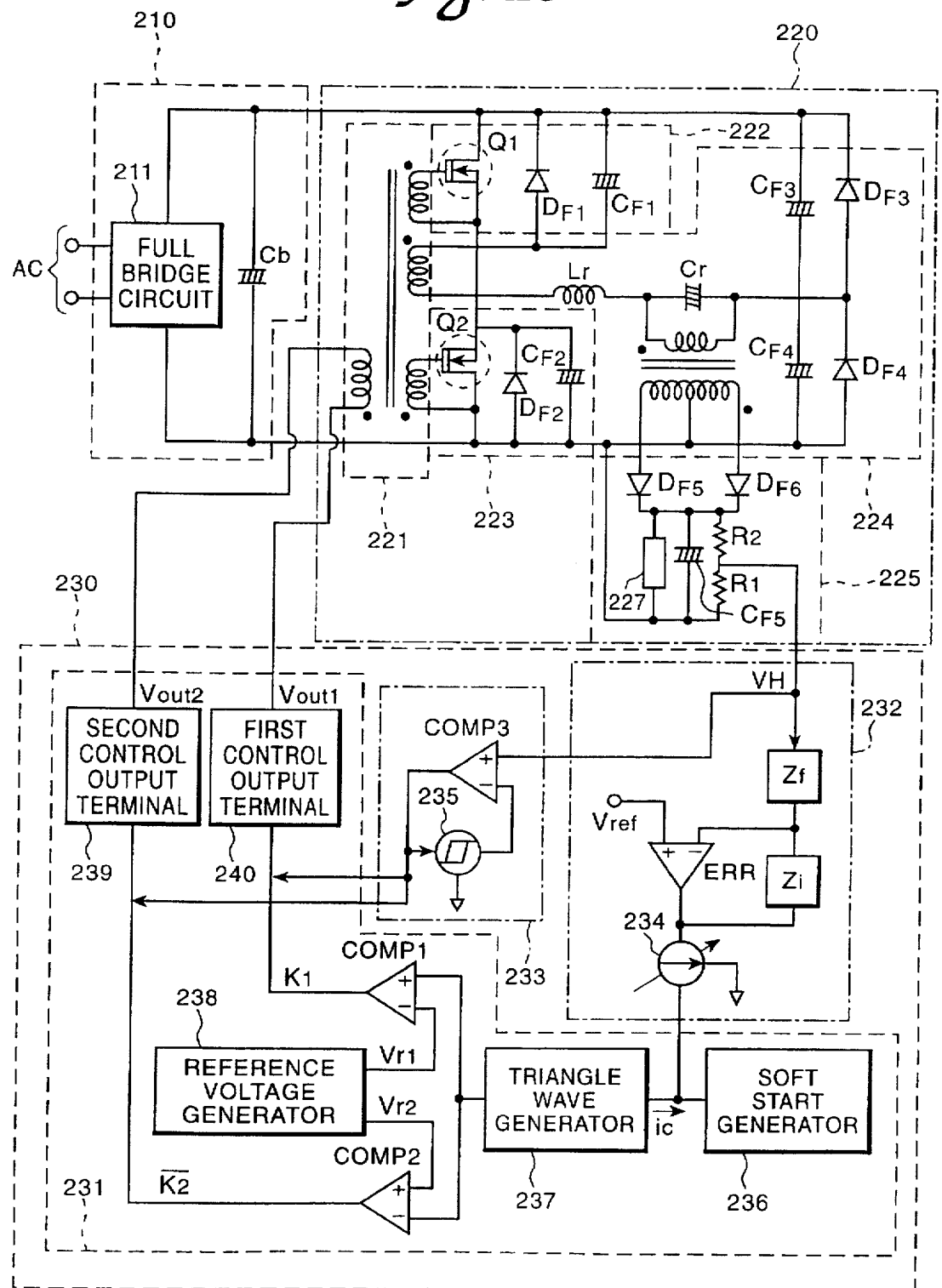
FIG. 18 is a block diagram showing another embodiment of a resonance mode converter of the present invention.

FIG. 18 is a block diagram showing another embodiment of a resonance mode converter and ZVS controller according to the present invention. FIG. 18 shows an AC rectifier 210, a resonance mode converter 220 and a ZVS controller 230, wherein commercial AC power is input so that a stable power source can be supplied to a load 227.

AC rectifier 210 receives commercial power (generally, 110/220 VAC, 60 Hz) from an external plug socket (not shown). Then, the input power is converted into DC power by full bridge diode circuit 211 and input capacitor $C_b$. The DC power is then output to resonance mode converter 220.

Resonance mode converter 220 is constituted by control transformer 221, first switch 222, second switch 223, resonator 224 and power transfer portion 225. Resonance mode converter 220 switches the current voltage input from AC rectifier 211 to a switching frequency according to the control of ZVS controller 230 so as to provide a load 227 with stable power. Transformer 221 is constituted by a control winding connected to an output of ZVS controller 230, a first switching winding connected to first switch 222, a second switching winding connected to second switch 223 and an induction winding connected to resonator 224. First and second switching windings are wound so as to have opposing polarities. First switch 222 is constituted by FET $Q_1$ whose gate is connected to the first switching winding of control transformer 221, diode $D_{F1}$ and capacitor $C_{F1}$ which are connected in parallel to the drain and source of FET $Q_1$. Second switch 223 is constituted by FET $Q_2$ whose gate is connected to the second switching winding of control transformer 221, diode $D_{F2}$ and capacitor $C_{F2}$ which are connected in parallel to the drain and source of FET $Q_2$. Resonator 224 is constituted by an induction winding whose one end is connected to a common point of first switch 222 and second switch 223, resonance coil $L_r$ and resonance capacitor $C_r$ connected in series with the induction winding, capacitor $C_{F3}$ and diode $D_{F3}$ connected in parallel between resonance capacitor $C_r$ and first switch 222, and capacitor $C_{F4}$ and diode $D_{F4}$ connected in parallel between resonance capacitor Cr and second switch 223. Power transfer portion 225 is constituted by a transformer whose first winding is connected in parallel to resonance capacitor $C_r$ and whose center tap of the secondary winding is connected to ground, diodes $D_{F5}$ and $D_{F6}$ are respectively connected to both ends of the secondary winding of the transformer, load 227 connected between diodes $D_{F5}$ and $D_{F6}$ and the power source grounding, capacitor $C_{F5}$ connected in parallel to load 227 and series resistors $R_1$ and $R_2$ connected across capacitor $C_{F5}$.

ZVS controller 230 is constituted by a feedback controller 232 connected to an output of resonance mode converter 220 and which detects an error voltage, no-load controller 233 connected to an output of resonance mode converter 220 and which detects a no-load state so as to shut down a switching of resonance mode converter 220, and main controller 231 connected to feedback controller 232 and no-load controller 233 and which controls a switching of resonance mode converter 220. Feedback controller 232 is constituted by error amplifier ERR for inputting feedback voltage $V_H$ from voltage divider resistors $R_1$ and $R_2$ that divides the voltage applied across load 227 in power transfer portion 225, to the inverse terminal, via impedance Zf, and for inputting reference voltage $V_{ref}$ to the non-inverting input so as to determine an amplification rate in accordance with impedances Zf and Zi; and current variator 234 for varying the current depending on the output of error amplifier ERR. Thus, feedback controller 232 amplifies the difference between feedback voltage $V_H$ and reference voltage $V_{ref}$ and converts the result into current so as to output the result to main controller 231. No-load controller 233 is constituted by hysteresis voltage generator 235 for generating the reference voltage having hysteresis characteristics and a hysteresis comparator COMP3 for comparing feedback voltage $V_H$ to the hysteresis reference voltage so as to sense a no-load state. No-load controller 233 senses whether there is a load to prevent an excess voltage from being applied to the second winding of the transformer of power transfer portion 225 when there is no load. Main controller 231 is constituted by a soft start generator 236 for buffering the power initially applied to load 227, triangle wave generator 237 for varying an oscillating frequency according to the current input from feedback controller 232 so as to generate a triangle wave signal, reference voltage generator 238 for generating a reference voltage to be compared with the triangle wave, first comparator COMP1 for receiving first reference voltage $V_{r1}$ from reference voltage generator 238, at its inverting input and for comparing first reference voltage $V_{r1}$ with the triangle wave, received at its non-inverting input, second comparator COMP2 for receiving second reference voltage $V_{r2}$, from reference voltage generator 238, at its non-inverting input and for comparing second reference voltage $V_{r2}$ with the triangle wave received at its inverting input, first control output terminal 240 connected to outputs of first comparator COMP1 and hysteresis comparator COMP3, and second control output terminal 239 connected to outputs of second comparator COMP2 and hysteresis comparator COMP3. Main controller 231 inputs feedback voltage $V_H$ so as to sense the difference between the feedback voltage $V_H$ with a reference voltage. Then, main controller 231 controls switches 222 and 223 via control transformer 221 so that the load can be provided with stable power.

FIGS. 19A to 19F illustrate operation waveforms of the device shown in FIG. 18. FIG. 19A illustrates the triangle wave generated from triangle wave generator 237, which has equal discharge and charge time periods, wherein $V_{r1}$ is a first reference voltage obtained from reference voltage generator 238, $V_{r2}$ is a second reference voltage obtained from reference voltage generator 238, and a' and b' are always the same. FIG. 19B illustrates the output of first comparator COMP1. The triangle wave of FIG. 19A is compared with first reference voltage $V_{r1}$. When the triangle wave is higher than reference voltage $V_{r1}$, the output signal of first comparator COMP1 is high, and when the triangle wave is lower than reference voltage $V_{r1}$, the output of first comparator signal is low. The output signal is Vout1 which is output via first control output terminal 240. FIG. 19C illustrates the output of second comparator COMP2. When the triangle wave shown in FIG. 19A is lower than second reference voltage $V_{r2}$, the output signal of second comparator COMP2 is high, and when the triangle wave is higher than second reference voltage $V_{r2}$, the output of second comparator signal is low. The output signal is $V_{out2}$, which is output via second control output terminal 239. FIG. 19D illustrates the turning on/off timings of first FET $Q_1$. When first control output $V_{out1}$ is high, and second control output $V_{out2}$ is low, first FET $Q_1$ is turned on, and for other conditions, first FET $Q_1$ is turned off. FIG. 19E illustrates the turning on/off timings of second FET $Q_2$. When first control output $V_{out1}$ is low, and second control output $V_{out2}$ is high, second FET $Q_2$ is turned on, for other conditions, second FET $Q_2$ is turned off. FIG. 19F illustrates current $i_L$ flowing through resonance coil $L_r$, wherein "1" corresponds to the first FET $Q_1$ on time period, "m" and "o" correspond to off time (dead time) periods of both first and second FETs $Q_1$ and $Q_2$, "n" corresponds to the on time period of second FET $Q_2$, and "$T_1$" and "$T_2$" correspond to time periods of zero voltage switching operations.

With reference to FIG. 18 and FIGS. 19A to 19F, the operation of this embodiment of the present invention will now be explained. First, ZVS controller 230 receives feedback voltage from resonance mode converter 220. More particularly, feedback voltage $V_H$ obtained from the voltage divider formed by resistors $R_1$ and $R_2$ is impact to controller 232 of ZVS controller 230. Feedback controller 232 inputs feedback voltage $V_H$ to error amplifier ERR via impedance Zf, when the output of full bridge circuit 211 is increased. Error amplifier ERR amplifies the difference between feedback voltage $V_H$ and reference voltage and outputs the result to variable current control circuit 234. Variable current control circuit 234 varies control current ic of feedback controller 232 and outputs the result to triangle wave generator 237. Control current ic is increased/decreased depending on the increase/decrease of feedback voltage $V_H$, voltage applied to the load. When control current ic increases, the triangle wave frequency of triangle wave generator 237 is heightened. When control current ic is decreased, the triangle wave frequency of triangle wave generator 237 is lowered. When the triangle wave frequency is heightened, an electricity delivery rate of resonance mode converter 220 is lowered. Thus, the output of the full bridge is lowered. When the triangle wave frequency is lowered, the electricity delivery rate of resonance mode converter 220 is raised. Thus, the output of the full bridge is heightened, which results in stabilization of the full bridge output. Soft start generator 236 controls triangle wave generator 237 at early times to generate a frequency higher than the normal switching frequency. Thus, the voltage applied to the load at early times can be moderated. In other words, the triangle wave frequency from the start to a predetermined time is heightened. Thus, the charge current of capacitor $C_{F5}$ in the output terminal of power transfer portion 225 of resonance mode converter 220 is limited during early early operating times. When a load is not on the output terminal of the full bridge and the suddenly increased output voltage is higher than the reference voltage generated from hysteresis generator 235, hysteresis comparator COMP3 of no-load controller 233 turns the output signal to "low" and outputs the result to first and second output terminals 240 and 239. Thus, first and second control voltages K1 and K2 are turned to "low," thereby shutting down switching. Once hysteresis comparator COMP3 operates, the reference voltage of hysteresis generator 235 is lowered and compared with the reference signal having a low full bridge output. Thus, the operation of hysteresis comparator COMP3 is shut down until the full bridge output goes down to a predetermined level or below. First and second comparators COMP1 and COMP2 of main controller 231 compare reference voltages $V_{r1}$ and $V_{r2}$ input from reference voltage generator 238 with a triangle wave so as to output first and second control outputs $V_{out1}$ and $V_{out2}$ shown in FIG. 19B and FIG. 19C, respectively. The following Table <2> shows first and second FETs $Q_1$ and $Q_2$ which are turned on/off by a control output.

TABLE 2

| first control output ($V_{out1}$) | second control output ($V_{out2}$) | first FET | second FET |
| --- | --- | --- | --- |
| high | low | on | off |
| low | high | off | on |
| high | high | off | off |
| low | low | off | off |

As shown in Table <2>, when first control output $V_{out1}$ is high and second control output $V_{out2}$ is low, the current flows towards the negative pole of the primary winding of control transformer 221. Thus, a positive electric potential is applied across the winding. A forward bias is applied to the gate of first FET $Q_1$ so as to turn first FET $Q_1$ on, and backward bias is applied to the gate of second FET $Q_2$ so as to turn second FET $Q_2$ off. On the contrary, when first control output $V_{out1}$ is "low" and second control output $V_{out2}$ is "high," the current flows towards the positive pole of the primary winding of control transformer 221. Thus, a negative electric potential is applied across the winding. A backward bias is applied to the gate of first FET $Q_1$ so as to turn first FET $Q_1$ off, and a forward bias is applied to the gate of second FET $Q_2$ so as to turn second FET $Q_2$ on. If both first and second control outputs $V_{out1}$ and $V_{out2}$ are both "high" or both "low," the current does not flow and no voltage is induced in the secondary winding. Thus, first and second FETs $Q_1$ and $Q_2$ are turned off. At this time, as shown in FIG. 19F, current $i_L$ flowing through tuning coil $L_r$ flows through diode $D_{F1}$ until current $i_L$ becomes zero from the moment of turning on first FET $Q_1$. Here, the drain-source voltage of first FET $Q_1$ is near zero. Accordingly, in section $T_1$, the switching loss caused by resonance current $i_L$ in first FET $Q_1$ is near to zero even though first FET $Q_1$ is turned on. Current $i_L$, after section $T_1$, is regenerated in the positive direction, which is called a resonance period. That is, referring to FIG. 19F, a resonance period is a section 1 $T_1$. In addition, current $i_L$ flows through diode $D_{F2}$ from the moment of turning on second FET $Q_2$ until current $i_L$ becomes zero. At this time, the drain-source voltage of second FET $Q_2$ is near zero. Therefore, in section $T_2$, the switching loss caused by resonance current $i_L$ in second FET $Q_2$ is near to zero even though second FET $Q_2$ is turned on. Current $i_L$ after section $T_2$ is regenerated in the negative direction, which is called a resonance period. That is, referring to FIG. 19F, a resonance period is a section n $T_2$.

As described above, the apparatus of the present invention is used for a resonance mode converter so as to perform a switching when the voltage between both ends of switching element is zero. Thus, power consumption by an element can be prevented and power efficiency is enhanced. In addition, noise caused by second harmonics is decreased, which results in good EMI characteristics. Further, the regenerated power is utilized in a powering mode, thereby increasing energy use efficiency. In addition, the control apparatus of the present invention is employed for an electronic ballast so as to control a power source depending on ambient illuminance. When an input voltage is lowered, energy can be saved by using a brownout circuit for reducing power consumption. Further, the control apparatus of the present invention can provide the load with stable power regardless of the input voltage and load changes. Thus, the life of a lamp can be extended due to preliminary heating in an initial start. Specifically, a preliminary heating is performed sufficiently at low temperature via a temperature sensor circuit. Thus, load damage and excess current, which are caused by impulse current, can be prevented.

What is claimed is:

1. A resonance mode power supply comprising:
    a resonance mode converter that inputs a DC voltage generated by rectifying an alternating current power and performs a zero voltage switching using a predetermined frequency and according to a drive signal, so as to provide a load with electricity; and
    a zero voltage switching controller including:
        a feedback controller that receives a first feedback signal from said resonance mode converter and compares it with a first reference voltage, said feedback controller providing a control current based on the comparison result,
        a main controller that receives said control current from said feedback controller, generates a triangle wave having a frequency based on said control current, and compares said triangle wave with a second reference voltage so as to output said drive signal to said resonance mode converter based on the comparison result, and
        a no-load sensor that receives a third feedback signal from said resonance mode converter and compares it with a third reference voltage having a hysteresis characteristic, said no-load sensor accordingly sensing a no-load state and causing said main controller to shut down said drive signal when there is no load.

2. A resonance mode power supply according to claim 1, wherein said resonance mode converter includes:
    first switching means connected to a positive terminal of an input for said DC voltage, for performing a first switching at zero voltage according to said drive signal,
    second switching means connected to a negative terminal of said input for said DC power and to said first switching means and which performs a second switching at zero voltage according to said drive signal,
    a control transformer whose primary winding is connected to said zero voltage switching controller and three secondary windings are connected respectively to said first switching means, said second switching means and said load,
    a serial resonance circuit connected to said control transformer, and
    an electricity delivery transformer that receives electricity from said serial resonance circuit and rectifies it so as to provide a power source to said load.

3. A resonance mode power supply according to claim 1, wherein said feedback controller includes:
    an error amplifier that receives said first feedback signal from said resonance mode converter via an impedance so as to compare it with said first reference voltage, and
    a current variator that receives the output of said error amplifier so as to output said control current.

4. A resonance mode power supply according to claim 1, wherein said no-load sensor includes:
    a hysteresis voltage generator that generates said third reference voltage having said hysteresis characteristic, and
    a hysteresis comparator that receives said second feedback signal and compares it with an output of said hysteresis voltage generator so as to detect said no-load state.

5. A resonance mode power supply according to claim 3, wherein said main controller includes:

a soft start circuit that increases said frequency of said triangle wave so as to lower a voltage in the early stages of applying power to said load so as to protect said load, a triangle wave generator that receives outputs of said soft start circuit and said current variator of said feedback controller so as to generate said triangle wave, a reference voltage generator that generates said second and a fourth reference voltages, a first comparator that compares the output of said triangle wave generator and said second reference voltage, a second comparator that compares the output of said triangle wave generator and said fourth reference voltage, a first control output that drives and outputs an output of said first comparator, and a second control output that drives and outputs an output of said second comparator.

* * * * *